US011336411B2

(12) United States Patent
Wu et al.

(10) Patent No.: US 11,336,411 B2
(45) Date of Patent: May 17, 2022

(54) METHOD AND DEVICE IN UE AND BASE STATION USED FOR WIRELESS COMMUNICATION

(71) Applicants: Keying Wu, Shanghai (CN); Xiaobo Zhang, Shanghai (CN); Lin Yang, Shanghai (CN)

(72) Inventors: Keying Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 82 days.

(21) Appl. No.: 17/019,365

(22) Filed: Sep. 14, 2020

(65) Prior Publication Data
US 2020/0412504 A1 Dec. 31, 2020

Related U.S. Application Data

(63) Continuation of application No. PCT/CN2019/085455, filed on May 5, 2019.

(30) Foreign Application Priority Data

May 8, 2018 (CN) .......................... 201810430153.8

(51) Int. Cl.
H04L 5/00 (2006.01)
H04W 72/12 (2009.01)

(52) U.S. Cl.
CPC ....... H04L 5/0048 (2013.01); H04W 72/1278 (2013.01)

(58) Field of Classification Search
CPC .......................... H04L 5/0048; H04W 72/1278
See application file for complete search history.

(56) References Cited

U.S. PATENT DOCUMENTS

2014/0192918 A1 7/2014 Park et al.
2018/0310276 A1* 10/2018 Zhang ................. H04W 72/042
2019/0207731 A1* 7/2019 Park ..................... H04B 7/0478

FOREIGN PATENT DOCUMENTS

CN 101282564 A 10/2008
CN 101291163 A 10/2008
(Continued)

OTHER PUBLICATIONS

Search Report of the CN Patent No. 201810430153.8 dated Mar. 11, 2020.
(Continued)

Primary Examiner — Duc C Ho

(57) ABSTRACT

The present disclosure provides a method and a device in a User Equipment (UE) and a base station for wireless communications. The UE receives a first signaling, and then transmits a first radio signal in a first subband. The first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s); whether the scheduling information of the first radio signal is non-codebook-based or codebook-based is related to the first field in the first signaling; the first subband is one of M subbands. The above method allows UE to flexibly switch between non-codebook-based and codebook-based uplink transmissions, thus avoiding the problem that a single uplink transmission mode cannot work on Unlicensed Spectrum.

20 Claims, 27 Drawing Sheets

(56) References Cited

FOREIGN PATENT DOCUMENTS

| CN | 101741445 A | 6/2010 |
|---|---|---|
| CN | 102123114 A | 7/2011 |
| CN | 102769510 A | 11/2012 |

OTHER PUBLICATIONS

1st Office Action of the CN Patent No. 201810430153.8 dated Apr. 7, 2020.
Notice of Allowance of the CN Patent No. 201810430153.8 dated May 25, 2020.
ISR in application PCT/CN2019/085455 dated Jun. 11, 2019.
Nokia et al., "On frequency selective precoding for UL-MIMO"3GPPTSG-RANWGI#89,R1-1708900,May 19, 2017 (May 19, 2017).

* cited by examiner

| First signaling | First field | Second field | ... |

FIG. 6

| First signaling | First field | Second field | Third field | ... |

FIG. 7

| Second signaling | ... | Fourth field | ... |

FIG. 25

METHOD AND DEVICE IN UE AND BASE STATION USED FOR WIRELESS COMMUNICATION

CROSS REFERENCE TO RELATED APPLICATIONS

This application is a continuation of International Application No. PCT/CN2019/085455, filed May 5, 2019, claims the priority benefit of Chinese Patent Application No. 201810430153.8, filed on May 8, 2018, the full disclosure of which is incorporated herein by reference.

BACKGROUND

Technical Field

The present disclosure relates to methods and devices in wireless communication systems, and in particular to a method and device in a wireless communication system that supports data transmissions on Unlicensed Spectrum.

Related Art

Application scenarios of future wireless communication systems are becoming increasingly diversified, and different application scenarios have different performance demands on systems. In order to meet different performance requirements of various application scenarios, a research project on access to unlicensed spectrum under New Radio (NR) was approved at the $3^{rd}$ Generation Partner Project (3GPP) Radio Access Network (RAN) #75 plenary session. In the Long Term Evolution (LTE) License Assisted Access (LAA) project, a transmitter (a base station or a User Equipment) needs to perform Listen Before Talk (LBT) before transmitting data on unlicensed spectrum to ensure that no interface is incurred to other ongoing wireless transmissions on the unlicensed spectrum.

In LTE system, codebook-based precoding is an important means to realize multi-antenna transmission. In codebook-based precoding technology, a receiver needs to estimate channel state information by measuring a reference signal, and provides feedback/notification of the estimated channel state information to the transmitter. In NR system, due to the rapid increase in the number of antennas, the channel estimation and feedback/notification overhead required by codebook-based precoding will also increase. In order to reduce the overhead and improve precoding accuracy, non-codebook-based uplink transmission is proposed in 3GPP RAN1. According to discussion result of 3GPP RAN1, codebook-based and non-codebook-based uplink transmissions are supported in NR system simultaneously. Whether a UE works under codebook-based or non-codebook-based uplink transmission mode is configured by a higher-layer signaling.

SUMMARY

In a non-codebook-based uplink transmission, a User Equipment (UE) determines a precoding matrix of an uplink reference signal according to a measurement performed on a downlink reference signal and transmits a corresponding uplink reference signal, and a same precoding matrix will be used for a subsequent uplink data transmission. The base station determines scheduling information of an uplink data transmission by measuring an uplink reference signal, such as a transmitting antenna port and a Modulation and Coding Scheme (MCS). Inventors find through researches that that under Unlicensed Spectrum, due to the influence of LBT, a transmission of a downlink reference signal cannot be guaranteed. When the corresponding downlink reference signal is not received, the UE will not be able to work under non-codebook-based uplink transmission mode.

In view of the above problem, the present disclosure provides a solution. It should be noted that the embodiments of a UE in the present disclosure and the characteristics of the embodiments may be applied to a base station if no conflict is incurred, and vice versa. The embodiments of the present disclosure and the characteristics of the embodiments may be mutually combined if no conflict is incurred.

The present disclosure provides a method in a UE for wireless communication, comprising:
  receiving a first signaling; and
  transmitting a first radio signal in a first subband;
  wherein the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, a problem needed to be solved in the present disclosure is: on Unlicensed Spectrum, when a non-codebook-based uplink transmission cannot be carried out due to LBT and other reasons, how to carry out an uplink transmission for a UE configured by a higher-layer signaling to work under non-codebook-based uplink transmission mode. The above method uses the first field in the first signaling to implicitly indicate whether a transmission of the first radio signal is non-codebook-based or codebook-based, so that the UE can flexibly switch between a non-codebook-based uplink transmission and a codebook-based uplink transmission, thus solving this problem.

In one embodiment, the above method is characterized in that whether a transmission of the first radio signal is non-codebook-based or codebook-based is judged according to the first field in the first signaling. The above method is advantageous in that the UE can flexibly switch between a non-codebook-based uplink transmission and a codebook-based uplink transmission, thus avoiding the problem that a single uplink transmission mode cannot work on unlicensed spectrum due to LBT and other reasons.

According to one aspect of the present disclosure, comprising:
  transmitting a first-type reference signal in a first reference-signal-resource set in the first subband;
  wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1.

According to one aspect of the present disclosure, wherein the first signaling comprises a second field, when the scheduling information of the first radio signal is non-codebook-based, a value of the second field in the first signaling is fixed; when the scheduling information of the first radio signal is codebook-based, the second field in the first signaling is used for determining a transmitting antenna port group of the first radio signal, the transmitting antenna port group of the first radio signal comprising a positive integer number of antenna port(s).

In one embodiment, the above method is advantageous in that, for a non-codebook-based uplink transmission and a codebook-based uplink transmission, a payload size of the first signaling remains unchanged, which reduces times and complexity of blind detections of UE.

According to one aspect of the present disclosure, wherein the first field in the first signaling is used for determining the first subband, and whether the scheduling information of the first radio signal is non-codebook-based or codebook-based is related to whether frequency resources occupied by the first signaling belong to the first subband.

According to one aspect of the present disclosure, wherein the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

According to one aspect of the present disclosure, wherein the first signaling comprises a third field, the first field in the first signaling is used for determining the first subband, and the third field in the first signaling is used for determining the first reference-signal-resource group, whether the scheduling information of the first radio signal is non-codebook-based or codebook-based is related to both the first field in the first signaling and the third field in the first signaling.

According to one aspect of the present disclosure, comprising:
receiving downlink information;
wherein the downlink information is used for determining the M subbands.

According to one aspect of the present disclosure, comprising:
receiving a second-type reference signal in a second reference-signal resource in the first subband;
wherein the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s).

According to one aspect of the present disclosure, comprising:
performing at least one of first channel access detection and second channel access detection in the first subband;
wherein the first channel access detection and the second channel access detection are respectively used for determining that the first subband can be used for transmitting the first radio signal and the first-type reference signal.

According to one aspect of the present disclosure, comprising:
receiving a second signaling;
wherein the second signaling is used for triggering transmission of the first-type reference signal.

The present disclosure provides a method in a base station for wireless communication, comprising:
transmitting a first signaling; and
receiving a first radio signal in a first subband;

wherein the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

According to one aspect of the present disclosure, comprising:
receiving a first-type reference signal in a first reference-signal-resource set in the first subband;
wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1.

According to one aspect of the present disclosure, wherein the first signaling comprises a second field, when the scheduling information of the first radio signal is non-codebook-based, a value of the second field in the first signaling is fixed; when the scheduling information of the first radio signal is codebook-based, the second field in the first signaling is used for determining a transmitting antenna port group of the first radio signal, the transmitting antenna port group of the first radio signal comprising a positive integer number of antenna port(s).

According to one aspect of the present disclosure, wherein the first field in the first signaling is used for determining the first subband, and whether the scheduling information of the first radio signal is non-codebook-based or codebook-based is related to whether frequency resources occupied by the first signaling belong to the first subband.

According to one aspect of the present disclosure, wherein the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

According to one aspect of the present disclosure, wherein the first signaling comprises a third field, the first field in the first signaling is used for determining the first subband, the third field in the first signaling is used for determining the first reference-signal-resource group, and whether the scheduling information of the first radio signal is non-codebook-based or codebook-based is related to both the first field in the first signaling and the third field in the first signaling.

According to one aspect of the present disclosure, comprising:
transmitting downlink information;
wherein the downlink information is used for determining the M subbands.

According to one aspect of the present disclosure, comprising:
transmitting a second-type reference signal in a second reference-signal resource in the first subband;

wherein the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s).

According to one aspect of the present disclosure, comprising:

performing third channel access detection in the first subband;

wherein the third channel access detection is used for determining that the first subband can be used for transmitting the second-type reference signal.

According to one aspect of the present disclosure, comprising:

transmitting a second signaling.

wherein the second signaling is used for triggering transmission of the first-type reference signal.

The present disclosure provides a UE for wireless communication, comprising:

a first receiver, receiving a first signaling; and a first transmitter, transmitting a first radio signal in a first subband;

wherein the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the above UE for wireless communication is characterized in that the first transmitter also transmits a first-type reference signal in a first reference-signal-resource set in the first subband; herein, a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1.

In one embodiment, the UE for wireless communication is characterized in that the first signaling comprises a second field, when the scheduling information of the first radio signal is non-codebook-based, a value of the second field in the first signaling is fixed; when the scheduling information of the first radio signal is codebook-based, the second field in the first signaling is used for determining a transmitting antenna port group of the first radio signal, the transmitting antenna port group of the first radio signal comprising a positive integer number of antenna port(s).

In one embodiment, the above UE for wireless communication is characterized in that the first field in the first signaling is used for determining the first subband, and whether the scheduling information of the first radio signal is non-codebook-based or codebook-based is related to whether frequency resources occupied by the first signaling belong to the first subband.

In one embodiment, the above UE for wireless communication is characterized in that the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

In one embodiment, the above UE for wireless communication is characterized in that the first signaling comprises a third field, the first field in the first signaling is used for determining the first subband, the third field in the first signaling is used for determining the first reference-signal-resource group, and whether the scheduling information of the first radio signal is non-codebook-based or codebook-based is related to both the first field in the first signaling and the third field in the first signaling.

In one embodiment, the above UE for wireless communication is characterized in that the first receiver also receives downlink information; wherein the downlink information is used for determining the M subbands.

In one embodiment, the above UE for wireless communication is characterized in that the first receiver also receives a second-type reference signal in a second reference signal resource in the first subband; herein, the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s).

In one embodiment, the above UE for wireless communication is characterized in that the first receiver also performs first channel access detection in the first subband; wherein the first channel access detection is used for determining that the first subband can be used for transmitting the first radio signal.

In one embodiment, the above UE for wireless communication is characterized in that the first receiver also performs second channel access detection in the first subband; wherein the second channel access detection is used for determining that the first subband can be used for transmitting the first-type reference signal.

In one embodiment, the above UE for wireless communication is characterized in that the first receiver also receives a second signaling; wherein the second signaling is used for triggering transmission of the first-type reference signal.

The present disclosure provides a base station for wireless communication, comprising:

a second transmitter, transmitting a first signaling; and a second receiver, receiving a first radio signal in a first subband;

wherein the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the above base station for wireless communication is characterized in that the second receiver also receives a first-type reference signal in a first reference-signal-resource set in the first subband; herein, a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1.

In one embodiment, the base station for wireless communication is characterized in that the first signaling comprises a second field, when the scheduling information of the first radio signal is non-codebook-based, a value of the second field in the first signaling is fixed; when the scheduling information of the first radio signal is codebook-based, the second field in the first signaling is used for determining a transmitting antenna port group of the first radio signal, the transmitting antenna port group of the first radio signal comprising a positive integer number of antenna port(s).

In one embodiment, the above base station for wireless communication is characterized in that the first field in the first signaling is used for determining the first subband, and whether the scheduling information of the first radio signal is non-codebook-based or codebook-based is related to whether frequency resources occupied by the first signaling belong to the first subband.

In one embodiment, the above base station for wireless communication is characterized in that the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

In one embodiment, the above base station for wireless communication is characterized in that the first signaling comprises a third field, the first field in the first signaling is used for determining the first subband, the third field in the first signaling is used for determining the first reference-signal-resource group, and whether the scheduling information of the first radio signal is non-codebook-based or codebook-based is related to both the first field in the first signaling and the third field in the first signaling.

In one embodiment, the above base station for wireless communication is characterized in that the second transmitter also transmits downlink information; herein, the downlink information is used for determining the M subbands.

In one embodiment, the above base station for wireless communication is characterized in that the second transmitter also transmits a second-type reference signal in a second reference signal resource in the first subband; herein, the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s).

In one embodiment, the above base station for wireless communication is characterized in that the second receiver also performs third channel access detection in the first subband; herein, the third channel access detection is used for determining that the first subband can be used for transmitting the second-type reference signal.

In one embodiment, the above base station for wireless communication is characterized in that the second transmitter also transmits a second signaling; herein, the second signaling is used for triggering transmission of the first-type reference signal.

In one embodiment, the present disclosure has the following advantages over conventional schemes:

It allows UE to switch flexibly between non-codebook-based and codebook-based uplink transmissions, thus avoiding the problem that a single uplink transmission mode cannot work on Unlicensed Spectrum due to LBT and other reasons.

A scheduling signaling is used for implicitly indicating whether the current uplink transmission is non-codebook-based or codebook-based, thus reducing signaling overhead.

For a non-codebook-based uplink transmission and a codebook-based uplink transmission, a payload size of a scheduling signaling remains unchanged, reducing times and complexity of blind detections of UE.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first signaling according to one embodiment of the present disclosure.

FIG. 7 illustrates a schematic diagram of a first signaling according to one embodiment of the present disclosure.

FIG. 25 illustrates a schematic diagram of a second signaling according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
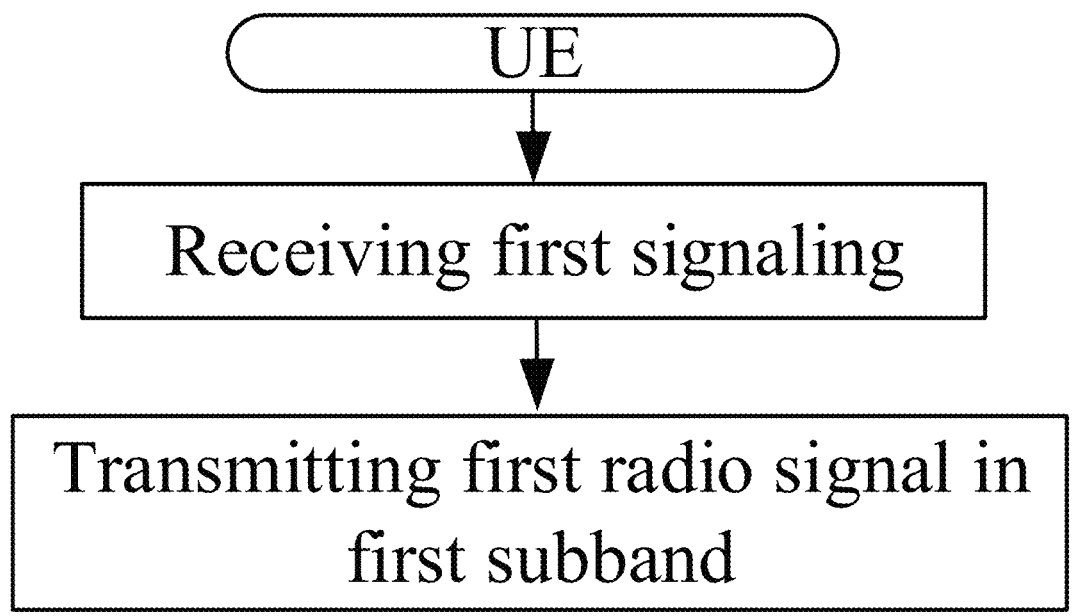
FIG. 1 illustrates a flowchart of a first signaling and a first radio signal according to one embodiment of the present disclosure.

Embodiment 1 illustrates a flowchart of first information and a first radio signal, as shown in FIG. 1.

In Embodiment 1, the UE in the present disclosure receives a first signaling; then transmits a first radio signal in a first subband. Herein, the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the first signaling is a physical-layer signaling.

In one embodiment, the first signaling is a dynamic signaling.

In one embodiment, the first subband is deployed at the Unlicensed Spectrum.

In one embodiment, the first subband comprises a Carrier.

In one embodiment, the first subband comprises multiple Carriers.

In one embodiment, the first subband comprises a Bandwidth Part (BWP) in a Carrier.

In one embodiment, the first subband comprises multiple BWPs in a Carrier.

In one embodiment, the first subband comprises a positive integer number of consecutive subcarriers.

In one embodiment, the first signaling is transmitted in the first subband.

In one embodiment, the first signaling is transmitted in one frequency band other than the first subband.

In one embodiment, the first signaling is transmitted in one frequency band of the M subbands.

In one embodiment, the first signaling is transmitted in a frequency band deployed at Unlicensed Spectrum.

In one embodiment, the first signaling is transmitted in a frequency band deployed at Licensed Spectrum.

In one embodiment, the first radio signal comprises uplink data.

In one embodiment, scheduling information of the first radio signal includes at least one of occupied time-domain resources, occupied frequency-domain resources, a Modulation and Coding Scheme (MCS), configuration information of DeModulation Reference Signals (DMRS), a Hybrid Automatic Repeat reQuest (HARD) process number, a Redundancy Version (RV), a New Data Indicator (NDI), a transmitting antenna port, corresponding Spatial Rx parameters, a corresponding Spatial Domain Transmission Filter and a corresponding Spatial Domain Receive Filter.

In one embodiment, configuration information of DMRS includes one or more of an RS sequence, a mapping mode, a DMRS type, occupied time-domain resources, occupied frequency-domain resources, occupied code-domain resources, a cyclic shift, and a Orthogonal Cover Code (OCC).

In one embodiment, a higher-layer parameter ulTxConfig of the UE is configured as NonCodebook.

In one embodiment, the specific meaning of the higher-layer parameter ulTxConfig can be found in 3GPP TS38.214, section 6 and 3GPP TS38.331.

In one embodiment, the higher-layer parameter ulTxConfig is a field in a PUSCH-Config Information Element (IE).

In one embodiment, the higher-layer parameter ulTxConfig is a field in first downlink information, and the first downlink information comprises part or all of information in a PUSCH-Config IE.

In one embodiment, the specific meaning of PUSCH-Config IE can be found in 3GPP TS38.331.

In one embodiment, any first-type reference signal resource in the first reference-signal-resource group is a Sounding Reference Signal (SRS) resource.

In one embodiment, scheduling information of the first radio signal being codebook-based means that a transmission of the first radio signal is codebook-based uplink transmission; and the specific meaning and implementation way of codebook-based uplink transmission can be found in 3GPP TS38.214, section 6.1.

In one embodiment, scheduling information of the first radio signal being codebook-based means that a generation of the first radio signal is codebook-based; and the specific meaning of codebook can be found in 3GPP TS36.211, section 6.3 or 3GPP TS38.211, section 6.3.

In one subembodiment of the above embodiment, a codebook comprises a positive integer number of vector(s) or matrix(matrices).

In one embodiment, scheduling information of the first radio signal being codebook-based means that a precoding of the first radio signal is a codebook-based precoding; and the specific meaning of codebook-based precoding can be found in 3GPP TS36.211, section 6.3 or 3GPP TS38.211, section 6.3.

In one embodiment, scheduling information of the first radio signal being codebook-based means that the first radio signal is generated by codebook-based precoding.

In one embodiment, scheduling information of the first radio signal being non-codebook-based means that a transmission of the first radio signal is non-codebook-based uplink transmission; and the specific meaning and implementation way of non-codebook-based uplink transmission can be found in 3GPP TS38.214, section 6.1.

In one embodiment, scheduling information of the first radio signal being non-codebook-based means that a generation of the first radio signal is non-codebook-based.

In one embodiment, scheduling information of the first radio signal being non-codebook-based means that precoding of the first radio signal is non-codebook-based precoding; and the specific meaning of non-codebook-based precoding can be found in 3GPP TS38.211, section 6.3.

In one embodiment, scheduling information of the first radio signal being non-codebook-based means that the first radio signal is generated by non-codebook-based precoding.

In one embodiment, the first field in the first signaling indicates that whether the scheduling information of the first radio signal is non-codebook-based or codebook-based.

In one embodiment, the first field in the first signaling implicitly indicates that whether the scheduling information of the first radio signal is non-codebook-based or codebook-based.

Embodiment 2

Figure 2:
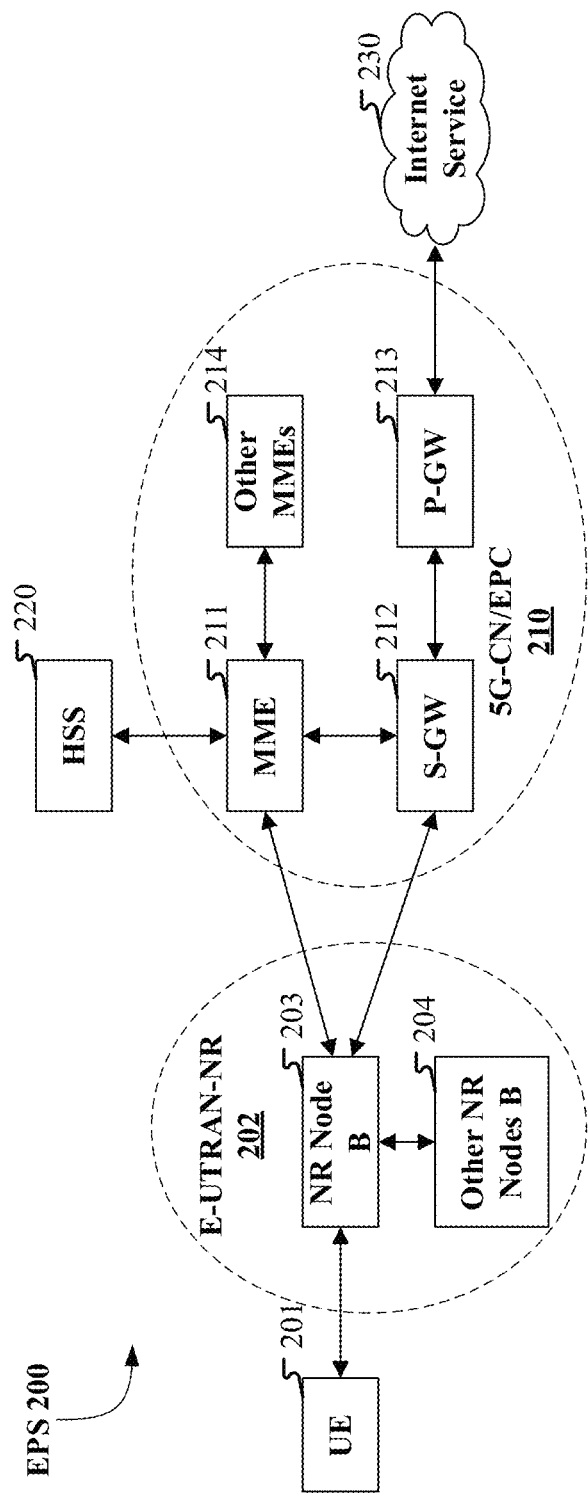
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the gNB 203 corresponds to the base station in the present disclosure.

In one embodiment, the UE 201 corresponds to the UE in the present disclosure.

In one embodiment, the UE 201 supports wireless communications for data transmission on Unlicensed Spectrum.

In one embodiment, the gNB 203 supports wireless communications for data transmission on Unlicensed Spectrum.

Embodiment 3

Figure 3:
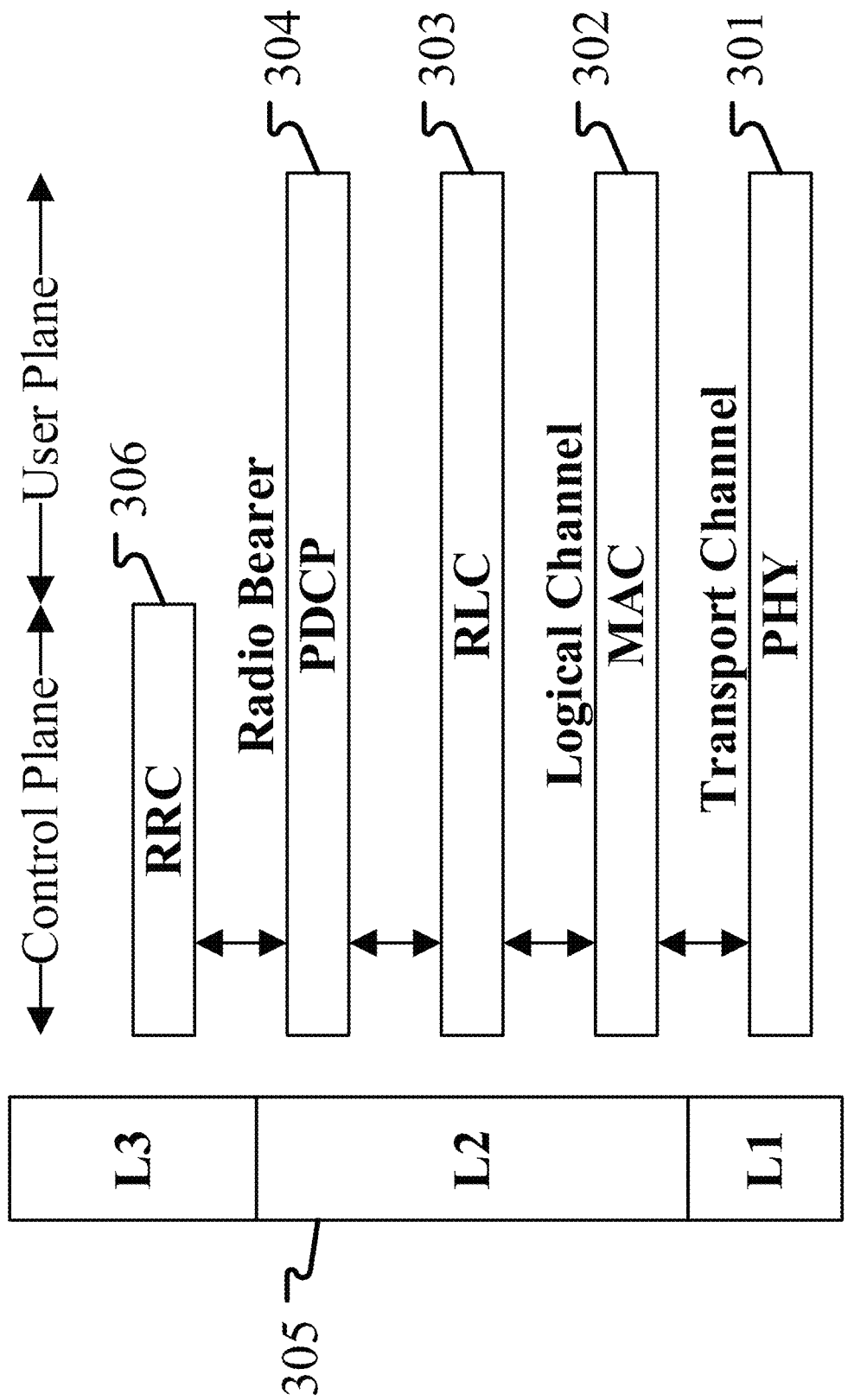
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first signaling in the present disclosure is generated by the MAC sublayer 302.

In one embodiment, the first radio signal in the present disclosure is generated by the PHY 301.

In one embodiment, the first-type reference signal in the present disclosure is generated by the PHY 301.

In one embodiment, the downlink information in the present disclosure is generated by the RRC sublayer 306.

In one embodiment, the downlink information in the present disclosure is generated by the MAC sublayer 302.

In one embodiment, the second-type reference signal in the present disclosure is generated by the PHY 301.

In one embodiment, the second signaling in the present disclosure is generated by the PHY 301.

In one embodiment, the second signaling in the present disclosure is generated by the MAC sublayer 302.

Embodiment 4

Figure 4:
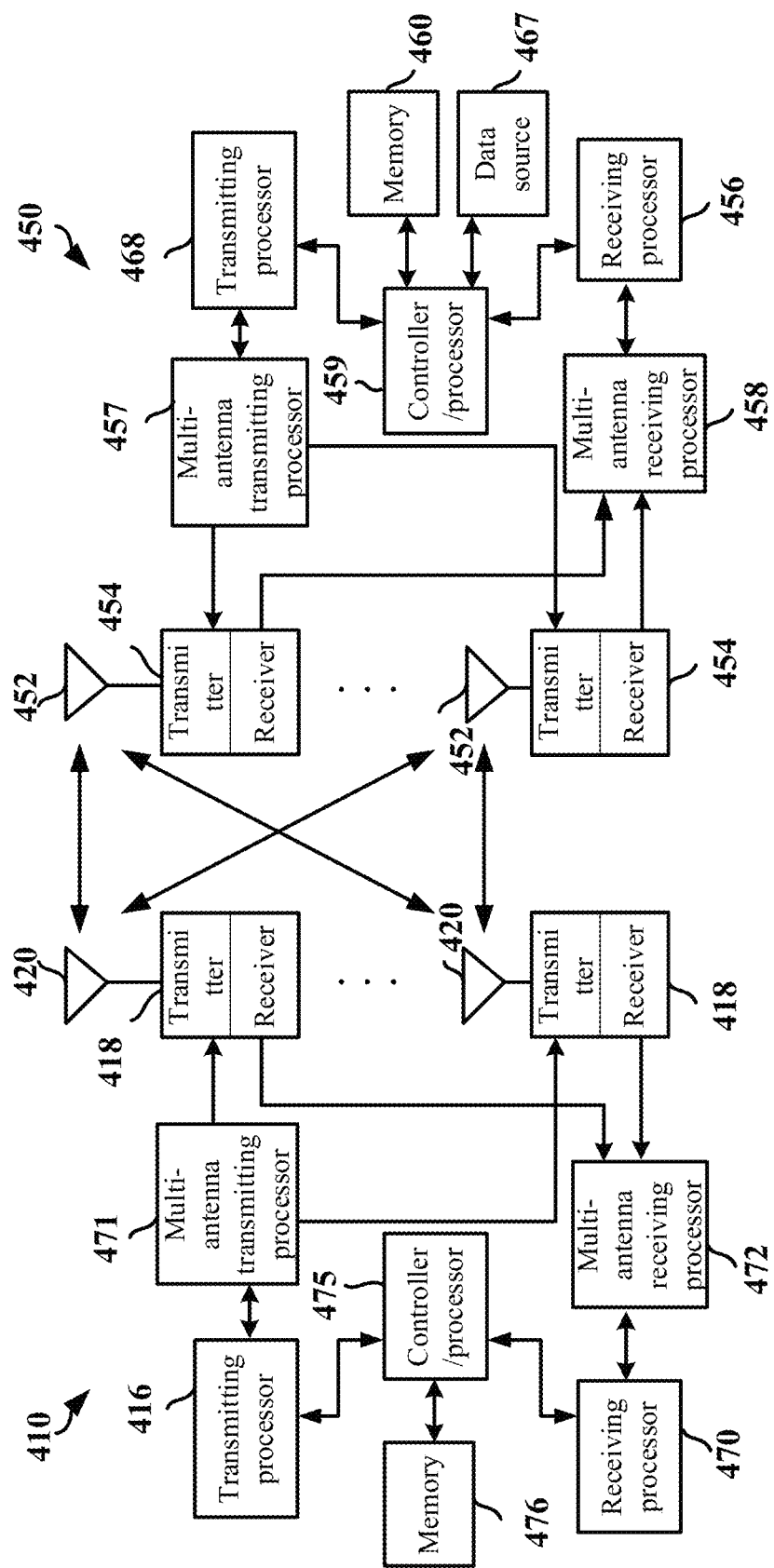
FIG. 4 illustrates a schematic diagram of a NR node and a UE according to one embodiment of the present disclosure.

Embodiment 4 illustrates a schematic diagram of a NR node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory, and the at least one memory includes computer program codes; the at least one memory and the computer program codes are configured to be used in collaboration with the at least one processor. The UE 450 at least: receives the first signaling in the present disclosure; and transmits the first radio signal in the present disclosure in the first subband in the present disclosure. Herein, the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the UE 450 comprises a memory that stores a computer readable instruction program. The computer readable instruction program generates an action when executed by at least one processor. The action includes: receiving the first signaling in the present disclosure; and transmitting the first radio signal in the present disclosure in the first subband in the present disclosure. Herein, the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the gNB 410 comprises at least one processor and at least one memory, and the at least one memory includes computer program codes; the at least one memory and the computer program codes are configured to be used in collaboration with the at least one processor. The gNB 410 at least: transmits the first signaling in the present disclosure; and receives the first radio signal in the present disclosure in the first subband in the present disclosure. Herein, the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the gNB 410 comprises a memory that stores a computer readable instruction program. The computer readable instruction program generates an action when executed by at least one processor. The action includes: transmitting the first signaling in the present disclosure; and receiving the first radio signal in the present disclosure in the first subband in the present disclosure.

Herein, the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the gNB 410 corresponds to the base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460, or the data source 467 is used for receiving the first signaling of the present disclosure; and at least one of the antenna 420, the transmitter 418, the transmitting processor 416, the multi-antenna transmitting processor 471, the controller/processor 475, or the memory 476 is used for transmitting the first signaling of the present disclosure.

In one embodiment, at least one of the antenna 420, the receiver 418, the receiving processor 470, the multi-antenna receiving processor 472, the controller/processor 475, or the memory 476 is used to receive the first radio signal in the present disclosure in the first subband in the present disclosure; and at least one of the antenna 452, the transmitter 454, the transmitting processor 468, the multi-antenna transmitting processor 457, the controller/processor 459, the memory 460, or the data source 467 is used to transmit the first radio signal in the present disclosure in the first subband in the present disclosure.

In one embodiment, at least one of the antenna 420, the receiver 418, the receiving processor 470, the multi-antenna receiving processor 472, the controller/processor 475, or the memory 476 is used to receive the first-type reference signal in the present disclosure in the first reference-signal-resource set in the first subband in the present disclosure; and at least one of the antenna 452, the transmitter 454, the transmitting processor 468, the multi-antenna transmitting processor 457, the controller/processor 459, the memory 460, or the data source 467 is used to transmit the first-type reference signal in the present disclosure in the first reference-signal-resource set in the first subband in the present disclosure.

In one embodiment, at least one of the antenna 452, the receiver 454, the receiving processor 456, the multi-antenna receiving processor 458, the controller/processor 459, the memory 460, or the data source 467 is used to receive the downlink information of the present disclosure; and at least one of the antenna 420, the transmitter 418, the transmitting processor 416, the multi-antenna transmitting processor 471, the controller/processor 475, or the memory 476 is used to transmit the downlink information of the present disclosure.

In one embodiment, at least one of the antenna 452, the receiver 454, the receiving processor 456, the multi-antenna receiving processor 458, the controller/processor 459, the memory 460, or the data source 467 is used to receive the second-type reference signal in the present disclosure in the second reference signal resource in the first subband in the present disclosure; and at least one of the antenna 420, the receiver 418, the receiving processor 416, the multi-antenna transmitting processor 471, the controller/processor 475, or the memory 476 is used to transmit the second-type reference signal in the present disclosure in the second reference signal resource in the first subband in the present disclosure.

In one embodiment, at least one of the antenna 452, the receiver 454, the receiving processor 456, the multi-antenna receiving processor 458, or the controller/processor 459 is used to perform the first channel access detection in the present disclosure in the first subband in the present disclosure.

In one embodiment, at least one of the antenna 452, the receiver 454, the receiving processor 456, the multi-antenna receiving processor 458, or the controller/processor 459 is used to perform the second channel access detection in the present disclosure in the first subband in the present disclosure.

In one embodiment, at least one of the antenna 420, the receiver 418, the receiving processor 470, the multi-antenna receiving processor 472, or the controller/processor 475 is used to perform the third channel access detection in the present disclosure in the first subband in the present disclosure.

In one embodiment, at least one of the antenna 452, the receiver 454, the receiving processor 456, the multi-antenna receiving processor 458, the controller/processor 459, the memory 460, or the data source 467 is used to receive the second signaling in the present disclosure; and at least one of the antenna 420, the transmitter 418, the transmitting processor 416, the multi-antenna transmitting processor 471, the controller/processor 475, or the memory 476 is used to transmit the second signaling of the present disclosure.

Embodiment 5

Figure 5:
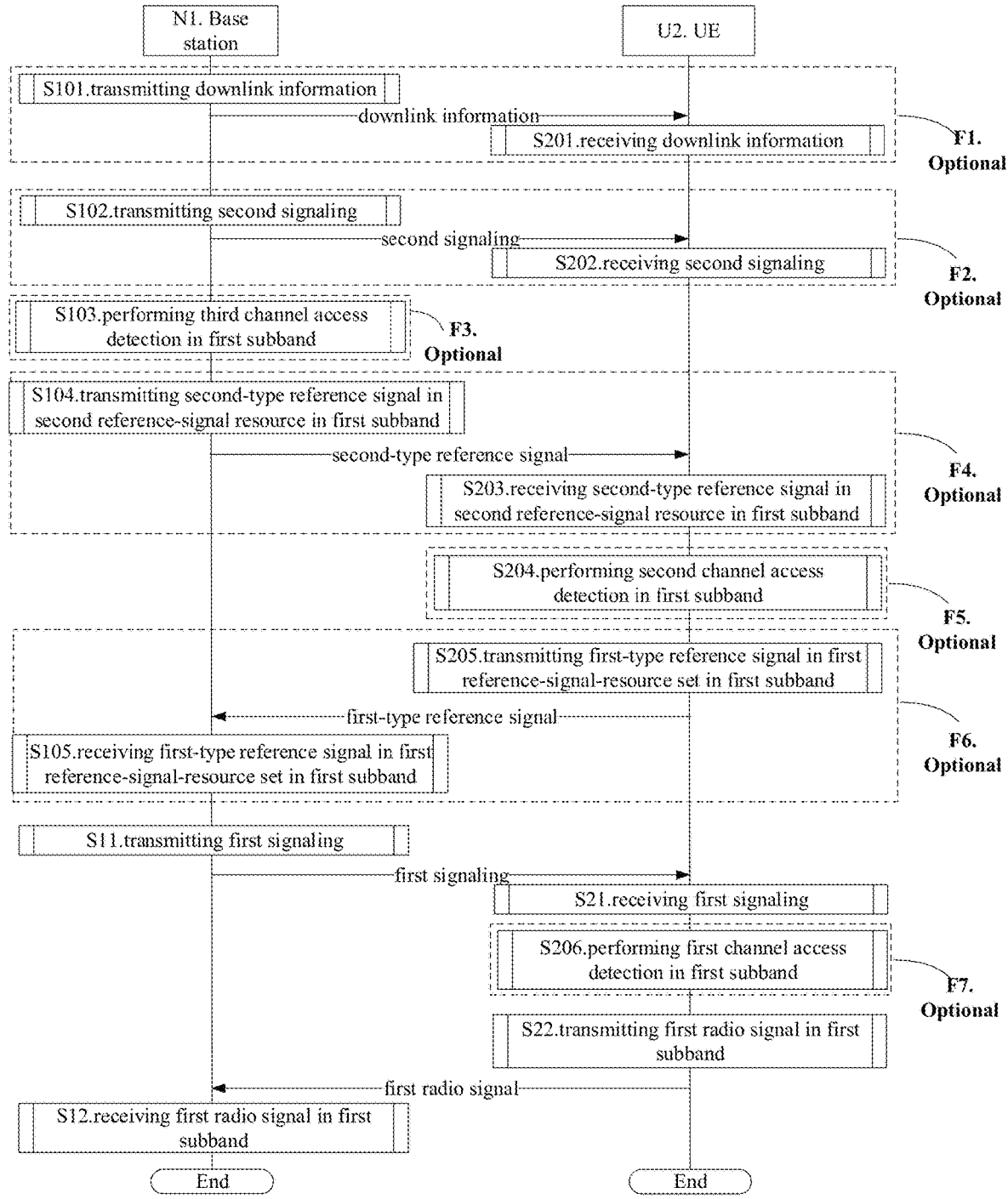
FIG. 5 illustrates a flowchart of wireless transmission according to one embodiment of the present disclosure.

Embodiment 5 illustrates a flow chart of wireless transmission, as shown in FIG. 5. In FIG. 5, a base station N1 is a maintenance base station for a serving cell of a UE U2. In FIG. 5, each step in block F1 to block F7 is optional.

The N1 transmits downlink information in step S101; transmits a second signaling in step S102; performs third channel access detection in a first subband in step S103; transmits a second-type reference signal in a second reference signal resource in the first subband in step S104; receives a first-type reference signal in a first reference-signal-resource set in the first subband in step S105; transmits a first signaling in step S11; and receives a first radio signal in the first subband in step S12.

The U2 receives downlink information in step S201; receives a second signaling in step S202; receives a second-type reference signal in a second reference signal resource in the first subband in step S203; performs second channel access detection in the first subband in step S204; transmits a first-type reference signal in a first reference-signal-resource set in the first subband in step S205; receives a first signaling in step S21; performs first channel access detection in the first subband in step S206; and transmits a first radio signal in a first subband in step S22.

In Embodiment 5, the first signaling comprises scheduling information of the first radio signal; the first signaling comprises a first field, the first field in the first signaling being used by the U2 for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1. A measurement performed on the first-type reference signal is used by the N1 for determining the scheduling information of the first radio signal, the first reference-signal-resource set comprises K first-type reference-signal resource(s), and the first reference-signal-resource group is a subset of the first reference-signal-resource set, the K being a positive integer no less than the K1. The downlink information is used by the U2 for determining the M subbands. If the first reference-signal-resource set is non-codebook-based, a measurement performed on the second-type reference signal is used by the U2 for determining a transmitting antenna port group of the first-type reference signal, and the transmitting antenna port group of the first reference signal comprises a positive integer number of antenna port(s). The first channel access detection and the second channel access detection are respectively used by the U2 for determining that the first subband can be used for transmitting the first radio signal and the first-type reference signal; and the third channel access detection is used by the N1 for determining that the first subband can be used for transmitting the second-type reference signal. The second signaling is used for triggering transmission of the first-type reference signal.

In one embodiment, the first-type reference signal comprises an SRS.

In one embodiment, the first signaling indicates an index of each first-type reference signal resource in the first reference-signal-resource group in the first reference-signal-resource set.

In one embodiment, the first signaling comprises a second field, when the scheduling information of the first radio signal is non-codebook-based, a value of the second field in the first signaling is fixed; when the scheduling information of the first radio signal is codebook-based, the second field in the first signaling is used for determining a transmitting antenna port group of the first radio signal, the transmitting antenna port group of the first radio signal comprising a positive integer number of antenna port(s).

In one embodiment, the first field in the first signaling is used for determining the first subband, and whether the scheduling information of the first radio signal is non-codebook-based or codebook-based is related to whether frequency resources occupied by the first signaling belong to the first subband.

In one embodiment, the first field in the first signaling is used for determining the first reference-signal-resource group, whether the scheduling information of the first radio signal is non-codebook-based or codebook-based is related to whether the first reference-signal-resource set is non-codebook-based or codebook-based.

In one embodiment, the first signaling comprises a third field, the first field in the first signaling is used for determining the first subband, the third field in the first signaling is used for determining the first reference-signal-resource group, and whether the scheduling information of the first radio signal is non-codebook-based or codebook-based is related to both the first field in the first signaling and the third field in the first signaling.

In one embodiment, the downlink information is carried by a high-layer signaling.

In one embodiment, the downlink information is carried by an RRC signaling.

In one embodiment, the downlink information is carried by a Medium Access Control Layer Control Element (MAC CE) signaling.

In one embodiment, the downlink information is cell-common.

In one embodiment, the downlink information is UE-specific.

In one embodiment, the downlink information is terminal-group-specific, the terminal group comprises a positive integer number of terminal(s), and the UE in the present disclosure is one terminal in the terminal group.

In one embodiment, the downlink information indicates the M subbands.

In one embodiment, the downlink information explicitly indicates the M subbands.

In one embodiment, the downlink information implicitly indicates the M subbands.

In one embodiment, the second-type reference signal comprises a CSI-RS.

In one embodiment, the second reference signal resource is a CSI-RS resource.

In one embodiment, an end time of the first channel access detection is no later than a start time of time resources occupied by the first radio signal.

In one embodiment, an end time of the second channel access detection is no later than a start time of time resources occupied by the first reference-signal-resource set.

In one embodiment, the first channel access detection is used for judging that whether the first subband can be used for transmitting a radio signal.

In one embodiment, the first channel access detection is used for judging that whether the first subband is idle.

In one embodiment, the first channel access detection is used for judging that whether the first subband can be used for transmitting the first radio signal.

In one embodiment, the first channel access detection is used for judging that whether the first subband is idle in time resources occupied by the first radio signal.

In one embodiment, the second channel access detection is used for judging that whether the first subband can be used for transmitting a radio signal.

In one embodiment, the second channel access detection is used for judging that whether the first subband is idle.

In one embodiment, the second channel access detection is used for judging that the first subband can be used for transmitting the first reference signal in the first reference-signal-resource set.

In one embodiment, the second channel access detection is used for judging that the first subband is idle in time resources occupied by the first reference-signal-resource set.

In one embodiment, an end time of the third channel access detection is no later than a start time of time resources occupied by the second reference signal resource.

In one embodiment, the third channel access detection is used for judging that whether the first subband can be used for transmitting a radio signal.

In one embodiment, the third channel access detection is used for judging that whether the first subband is idle.

In one embodiment, the third channel access detection is used for judging that the first subband can be used for transmitting the second reference signal in the second reference-signal-resource set.

In one embodiment, the third channel access detection is used for judging that the first subband is idle in time resources occupied by the second reference signal resource.

In one embodiment, the second signaling is a physical-layer signaling.

In one embodiment, the second signaling is a dynamic signaling.

In one embodiment, the second signaling is transmitted in the first subband.

In one embodiment, the second signaling is transmitted in one frequency band other than the first subband.

In one embodiment, the second signaling is transmitted in one subband of the M subbands.

In one embodiment, the second signaling is transmitted in one subband deployed at Unlicensed Spectrum.

In one embodiment, the second signaling is transmitted in one frequency band deployed at Licensed Spectrum.

In one embodiment, the first signaling is transmitted on a downlink physical layer control channel (i.e., a downlink channel that can only be used for carrying a physical-layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the first radio signal is transmitted on an uplink physical layer data channel (i.e., an uplink channel can be used for carrying physical layer data).

In one subembodiment of the above embodiment, the uplink physical layer data channel is a Physical Uplink Shared CHannel (PUSCH).

In one subembodiment of the above embodiment, the uplink physical layer data channel is a short Physical Uplink Shared Channel (sPUSCH).

In one subembodiment of the above embodiment, the uplink physical layer data channel is a New Radio PUSCH (NR-PUSCH).

In one subembodiment of the above embodiment, the uplink physical layer data channel is a Narrow Band PUSCH (NB-PUSCH).

In one embodiment, a transmission channel corresponding to the first radio signal is an Uplink Shared Channel (UL-SCH).

In one embodiment, the downlink information is transmitted on a downlink physical layer data channel (that is, a downlink channel can be used for carrying physical layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one subembodiment of the above embodiment, the downlink physical layer data channel is a Narrow Band PDSCH (NB-PDSCH).

In one embodiment, the second signaling is transmitted on a downlink physical layer control channel (i.e., a downlink channel that can only be used for carrying physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

Embodiment 6

Figure 6:
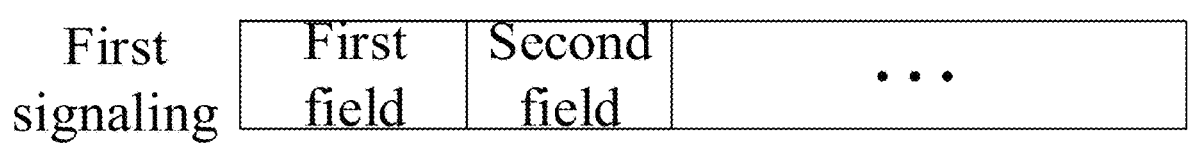

Embodiment 6 illustrates a schematic diagram of a first signaling, as shown in FIG. 6.

In Embodiment 6, the first signaling comprises scheduling information of the first radio signal in the present disclosure. The first signaling comprises a first field and a second field. The first field in the first signaling is used for determining the first reference-signal-resource group in the present disclosure or the first subband in the present disclosure. Whether the scheduling information of the first radio signal is non-codebook-based or codebook-based is related to the first field in the first signaling. When the scheduling information of the first radio signal is non-codebook-based, a value of the second field in the first signaling is fixed; and when the scheduling information of the first radio signal is codebook-based, the second field in the first signaling is used for determining a transmitting antenna port group of the first radio signal.

In one embodiment, the first signaling is a dynamic signaling for UpLink Grant.

In one embodiment, the first signaling comprises Downlink Control Information (DCI).

In one embodiment, the first signaling comprises UpLink Grant DCI.

In one embodiment, the first signaling group is UE-specific.

In one embodiment, a signaling identifier of the first signaling is a Cell-Radio Network Temporary Identifier (C-RNTI).

In one embodiment, the first signaling is DCI identified by a C-RNTI.

In one embodiment, a payload size of the first signaling is independent of whether the scheduling information of the first radio signal is non-codebook-based or codebook-based.

In one embodiment, a number of bits comprised in the first field in the first signaling is independent of whether the scheduling information of the first radio signal is non-codebook-based or codebook-based.

In one embodiment, the first field in the first signaling is used for determining the first reference-signal-resource group.

In one embodiment, the first field in the first signaling indicates the first reference-signal-resource group.

In one embodiment, the first field in the first signaling explicitly indicates the first reference-signal-resource group.

In one embodiment, the first field in the first signaling implicitly indicates the first reference-signal-resource group.

In one embodiment, the first field in the first signaling indicates an index of each first-type reference signal resource in the first reference-signal-resource group in the first reference-signal-resource set in the present disclosure.

In one embodiment, the first field in the first signaling indicates the K1 in the present disclosure.

In one embodiment, the first field in the first signaling is used for determining the first subband.

In one embodiment, the first field in the first signaling indicates the first subband.

In one embodiment, the first field in the first signaling explicitly indicates the first subband.

In one embodiment, the first field in the first signaling implicitly indicates the first subband.

Embodiment 7

Embodiment 7 illustrates a schematic diagram of a first signaling, as shown in FIG. 7.

In Embodiment 7, the first signaling comprises scheduling information of the first radio signal in the present disclosure. The first signaling comprises a first field, a second field and a third field. The first field in the first signaling is used for determining the first subband in the present disclosure, the third field in the first signaling is used for determining the first reference-signal-resource group in the present disclosure, and whether the scheduling information of the first radio signal is non-codebook-based or codebook-based is related to both the first field in the first signaling and the third field in the first signaling. When the scheduling information of the first radio signal is non-codebook-based, a value of the second field in the first signaling is fixed; and when the scheduling information of the first radio signal is codebook-based, the second field in the first signaling is used for determining a transmitting antenna port group of the first radio signal.

In one embodiment, a number of bits comprised in the third field in the first signaling is independent of whether the scheduling information of the first radio signal is non-codebook-based or codebook-based.

In one embodiment, the third field in the first signaling comprises part or all of information in an SRS resource indicator field.

In one subembodiment of the above embodiment, the specific meaning of the SRS resource indicator field can be found in 3GPP TS38.212, section 7.3.

In one embodiment, a number of bit(s) comprised in the third field in the first signaling belongs to 1, 2, 3 and 4.

In one embodiment, the first field in the first signaling and the third field in the first signaling are used together for determining the first reference-signal-resource group.

Embodiment 8

Figure 8:
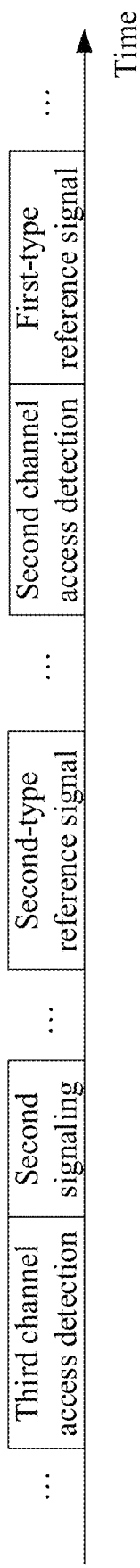
FIG. 8 illustrates a schematic diagram of sequential relationships among a second signaling, second channel access detection, third channel access detection, a first-type reference signal and a second-type reference signal according to one embodiment of the present disclosure.

Embodiment 8 illustrates a schematic diagram of sequential relationships among a second signaling, second channel access detection, third channel access detection, a first-type reference signal and a second-type reference signal, as shown in FIG. 8.

In Embodiment 8, the second signaling is used for triggering the UE in the present disclosure to transmit the first-type reference signal and receive the second-type reference signal. The second signaling, the first-type reference signal and the second-type reference signal are all transmitted in the first subband in the present disclosure; time resources occupied by the second-type reference signal are later than time resources occupied by the second signaling. The second channel access detection is used by the UE for determining that the first subband can be used for transmitting the first-type reference signal; the third channel access detection is used by the base station in the present disclosure for determining that the first subband can be used for transmitting the second signaling and the second-type reference signal.

In one embodiment, the third channel access detection is used for determining that the first subband can be used for transmitting the second signaling.

In one embodiment, an end time of the third channel access detection is no later than a start time of time resources occupied by the second signaling.

In one embodiment, the second signaling is used for triggering a reception for the second-type reference signal.

In one embodiment, the second signaling is used for determining the second reference signal resource.

In one embodiment, the second signaling explicitly indicates the second reference signal resource.

In one embodiment, the second signaling implicitly indicates the second reference signal resource.

Embodiment 9

Figure 9:
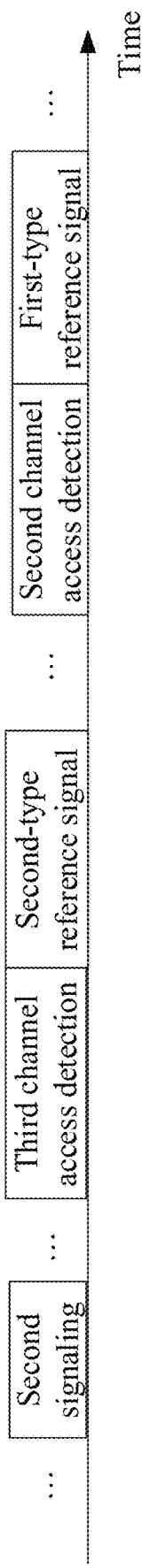
FIG. 9 illustrates a schematic diagram of sequential relationships among a second signaling, second channel access detection, third channel access detection, a first-type reference signal and a second-type reference signal according to one embodiment of the present disclosure.

Embodiment 9 illustrates a schematic diagram of sequential relationships among a second signaling, second channel access detection, third channel access detection, a first-type reference signal and a second-type reference signal, as shown in FIG. 9.

In Embodiment 9, the second signaling is used for triggering the UE in the present disclosure to transmit the first-type reference signal. The second signaling is transmitted in a subband other than the first subband in the present disclosure; time resources occupied by the second-type reference signal are later than time resources occupied by the second signaling. The second channel access detection is used by the UE for determining that the first subband can be used for transmitting the first-type reference signal; the third channel access detection is used by the base station in the present disclosure for determining that the first subband can be used for transmitting the second-type reference signal.

In one embodiment, a start time of the third channel access detection is later than an end time of time resources occupied by the second signaling.

Embodiment 10

Figure 10:
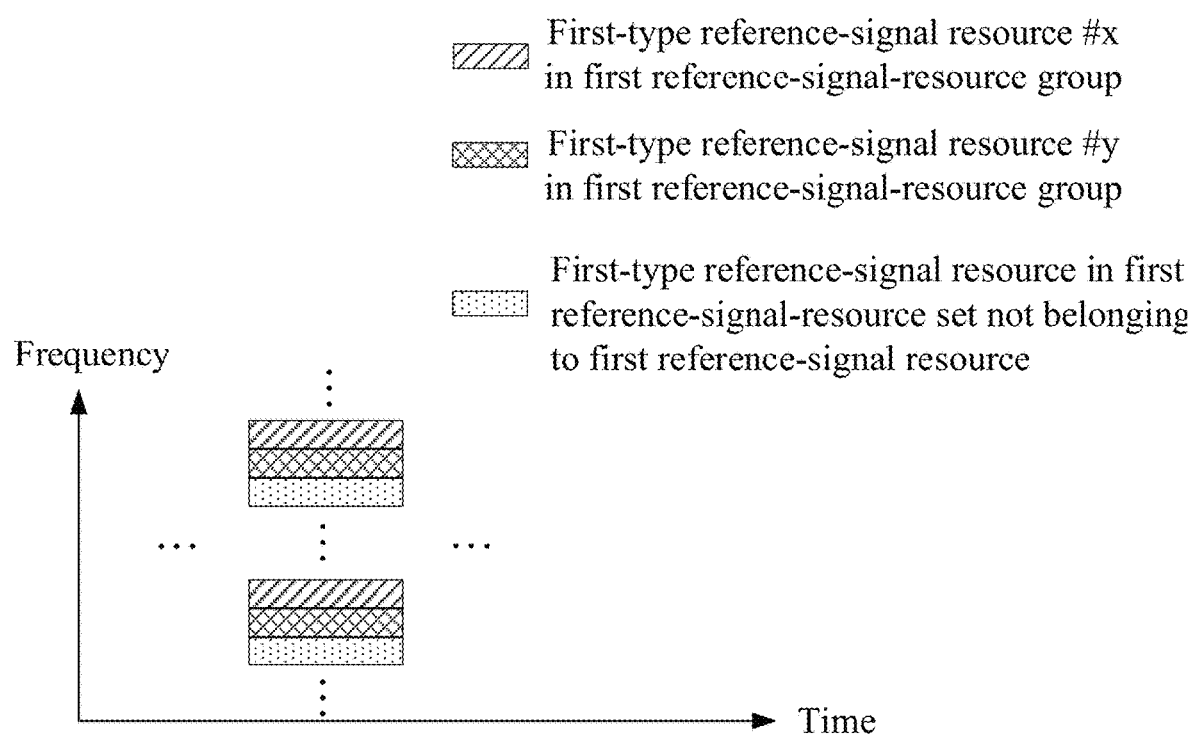
FIG. 10 illustrates a schematic diagram of resource mapping of a first reference-signal-resource group in time-frequency domain according to one embodiment of the present disclosure.

Embodiment 10 illustrates a schematic diagram of resource mapping of a first reference-signal-resource group in time-frequency domain, as shown in FIG. 10.

In Embodiment 10, the first reference-signal-resource group comprises K1 first-type reference signal resource(s); the first reference-signal-resource group is a subset of the first reference-signal-resource set in the present disclosure, and the first reference-signal-resource set comprises K first-type reference signal resource(s); the K1 is a positive integer, and the K is a positive integer no less than the K1. The first reference-signal-resource set is reserved for the first-type reference signal in the present disclosure; a measurement performed on the first-type reference signal is used for determining the scheduling information of the first radio signal in the present disclosure.

In FIG. 10, a rectangle filled with left slashes represents a first-type reference signal resource #x in the first reference-signal-resource group, and a rectangle filled with crossing lines represents a first-type reference signal resource #y in the first reference-signal-resource group, and a rectangle filled with dots represents a first-type reference signal resource not belonging to the first reference-signal-resource group in the first reference-signal-resource set; wherein the x and the y are respectively non-negative integers less than the K1, the x being not equal to the y.

In one embodiment, the first reference-signal-resource set is non-codebook-based.

In one embodiment, the K1 is equal to 1.

In one embodiment, the K1 is greater than 1.

In one embodiment, any first-type reference signal resource in the first reference-signal-resource group is a SRS resource.

In one embodiment, any first-type reference signal resource in the first reference-signal-resource group comprises at least first two of time-domain resources, frequency-domain resources and code-domain resources.

In one embodiment, the first reference-signal-resource set is SRS resource set.

In one embodiment, the first reference-signal-resource set comprises K SRS resource(s).

In one embodiment, any first-type reference signal resource comprised in the first reference-signal-resource set is SRS resource.

In one embodiment, the first-type reference signal comprises an SRS.

In one embodiment, the first-type reference signal comprises a periodic SRS.

In one embodiment, the first-type reference signal comprises a semi-persistent SRS.

In one embodiment, the first-type reference signal comprises an aperiodic SRS.

In one embodiment, the K is equal to 1.

In one embodiment, the K is greater than 1.

In one embodiment, the K is greater than the K1.

In one embodiment, the K is equal to the K1.

In one embodiment, any first-type reference signal resource in the first reference-signal-resource set comprises at least first two of time-domain resources, frequency-domain resources and code-domain resources.

In one embodiment, the first-type reference signal only occurs once in time domain.

In one embodiment, the first-type reference signal occurs multiple times in time domain.

In one embodiment, a measurement performed on a latest occurrence earlier than a first time in time domain of the first-type reference signal is used for determining the scheduling information of the first radio signal.

In one subembodiment of the above embodiment, the first time is a start time of time resources occupied by the first signaling in the present disclosure.

In one subembodiment of the above embodiment, the first time is a start time of time resources occupied by the first radio signal.

In one embodiment, any first-type reference signal resource in the first reference-signal-resource set occupies a positive integer number of multicarrier symbol(s) in time domain.

In one embodiment, any first-type reference signal resource in the first reference-signal-resource set occupies a positive integer number of consecutive multicarrier symbols in time domain.

In one embodiment, any first-type reference signal resource in the first reference-signal-resource set occupies a positive integer number of inconsecutive multicarrier symbols in time domain.

In one embodiment, any first-type reference signal resource in the first reference-signal-resource set occupies one multicarrier symbol in time domain.

In one embodiment, any first-type reference signal resource in the first reference-signal-resource set belongs to the first subband in the present disclosure in frequency domain.

In one embodiment, any first-type reference signal resource in the first reference-signal-resource set occupies a positive integer number of subcarrier(s) in frequency domain.

In one embodiment, any first-type reference signal resource in the first reference-signal-resource set occupies a positive integer number of inconsecutive subcarriers in frequency domain.

In one embodiment, the first subband is divided into a positive integer number of frequency-domain region(s), any first-type reference signal resource in the first reference-signal-resource set occurs in each of the positive integer number of frequency-domain region(s), and any of the positive integer number of frequency-domain region(s) comprises a positive integer number of consecutive subcarriers.

In one subembodiment of the above embodiment, a number of subcarriers comprised in any two regions of the positive integer number of frequency-domain regions is the same.

In one embodiment, the first subband is divided into a positive integer number of frequency-domain region(s), any first-type reference signal resource in the first reference-signal-resource set only occurs in part of the positive integer number of frequency-domain region(s), and any of the positive integer number of frequency-domain region(s) comprises a positive integer number of consecutive subcarriers.

In one subembodiment of the above embodiment, a number of subcarriers comprised in any two of the positive integer number of frequency-domain regions is the same.

In one embodiment, the K first-type reference signal resource(s) occupies(occupy) same time resources in time domain.

In one embodiment, the K first-type reference signal resource(s) occupies (occupy) two mutually-orthogonal frequency resources in frequency domain.

In one embodiment, there at least exist two first-type reference signal resources in the K first-type reference signal resources occupying same time resources, same frequency resources and mutually-orthogonal code-domain resources.

In one embodiment, a multicarrier symbol is an Orthogonal Frequency Division Multiplexing (OFDM) symbol.

In one embodiment, a multicarrier symbol is a Single Carrier-Frequency Division Multiple Access (SC-FDMA) symbol.

In one embodiment, a multicarrier symbol is a Discrete Fourier Transform Spread OFDM (DFT-S-OFDM) symbol.

Embodiment 11

Figure 11:
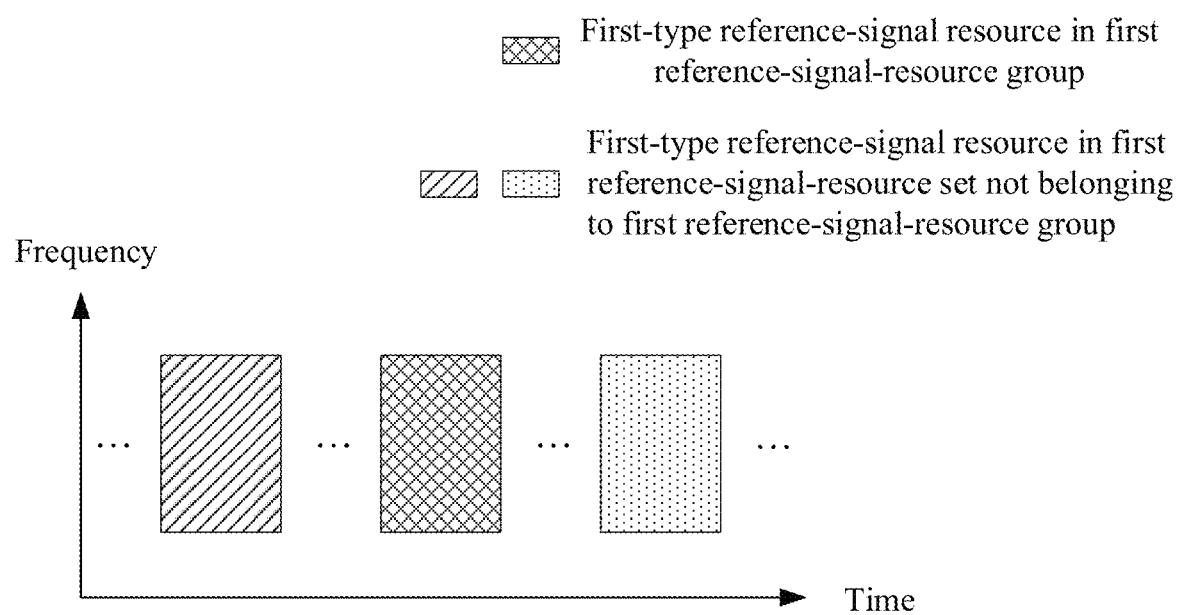
FIG. 11 illustrates a schematic diagram of resource mapping of a first reference-signal-resource group in time-frequency domain according to one embodiment of the present disclosure.

Embodiment 11 illustrates a schematic diagram of resource mapping of a first reference-signal-resource group in time-frequency domain, as shown in FIG. 11.

In Embodiment 11, the first reference-signal-resource group comprises K1 first-type reference signal resource(s); the first reference-signal-resource group is a subset of the first reference-signal-resource set in the present disclosure, and the first reference-signal-resource set comprises K first-type reference signal resource(s); the K1 is a positive integer, and the K is a positive integer no less than the K1. The first reference-signal-resource set is reserved for the first-type reference signal in the present disclosure; a measurement performed on the first-type reference signal is used for determining the scheduling information of the first radio signal in the present disclosure.

In FIG. 11, a rectangle filled with crossing lines represents a first-type reference signal resource in the first reference-signal-resource group, a rectangle filled with left slashes and a rectangle filled with dots both represent a first-type reference signal resource in the first reference-signal-resource set not belonging to the first reference-signal-resource group.

In one embodiment, the first reference-signal-resource set is codebook-based.

In one embodiment, the K first-type reference signal resource(s) occupies (occupy) two mutually-orthogonal time resources in time domain.

In one embodiment, the K first-type reference signal resource(s) occupies (occupy) same frequency resources in frequency domain.

Embodiment 12

Figure 12:
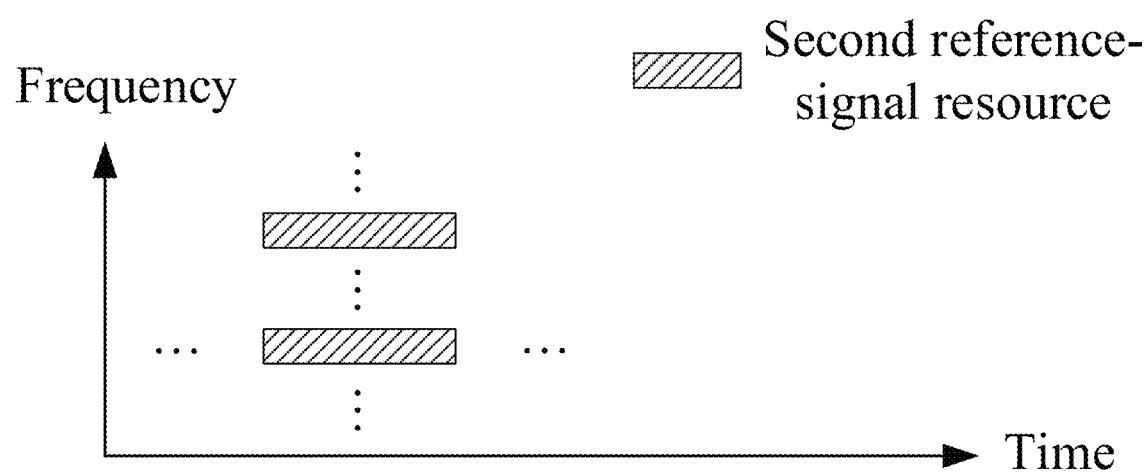
FIG. 12 illustrates a schematic diagram of resource mapping of second reference signal resource in time-frequency domain according to one embodiment of the present disclosure.

Embodiment 12 illustrates a schematic diagram of resource mapping of a second reference signal resource in time-frequency domain, as shown in FIG. 12.

In Embodiment 12, the second reference signal resource is reserved for the second-type reference signal in the present disclosure. The first reference-signal-resource set in the present disclosure is reserved for the first-type reference signal in the present disclosure. The first reference-signal-resource set is non-codebook-based, and a measurement performed on the second-type reference signal is used for determining a transmitting antenna port group of the first-type reference signal. In FIG. 12, a rectangle filled with left slashes represents the second reference signal resource.

In one embodiment, the second reference signal comprises a Channel Status Information Reference Signal (CSI-RS).

In one embodiment, the second-type reference signal comprises a periodic CSI-RS.

In one embodiment, the second-type reference signal comprises a semi-persistent CSI-RS.

In one embodiment, the second-type reference signal comprises an aperiodic CSI-RS.

In one embodiment, the second reference signal resource is a CSI-RS resource.

In one embodiment, the second reference signal resource comprises at least first two of time-domain resources, frequency-domain resources and code-domain resources.

In one embodiment, the second-type reference signal only occurs once in time domain.

In one embodiment, the second-type reference signal occurs multiple times in time domain.

In one embodiment, a transmitting antenna port group of the first-type reference signal is independent of an occurrence of the second-type reference signal later than a second time in time domain; the second time is earlier than a start time of the first reference-signal-resource set in time domain, and a time interval between the second time and a start time of the first reference-signal-resource set is a first threshold, the first threshold being a positive integer.

In one embodiment of the above embodiment, the first threshold is 42 multicarrier symbols.

In one subembodiment of the above embodiment, the first threshold is measured by multicarrier symbol.

In one embodiment, the second reference signal resource occupies a positive integer number of multicarrier symbol(s) in time domain.

In one embodiment, the second reference signal resource occupies a positive integer number of consecutive multicarrier symbols in time domain.

In one embodiment, the second reference signal resource occupies a positive integer number of inconsecutive multicarrier symbols in time domain.

In one embodiment, the second reference signal resource belongs to the first subband in the present disclosure in frequency domain.

In one embodiment, the second reference signal resource occupies a positive integer number of subcarrier(s) in frequency domain.

In one embodiment, the second reference signal resource occupies a positive integer number of inconsecutive subcarriers in frequency domain.

In one embodiment, the first subband is divided into a positive integer number of frequency-domain region(s), the second reference signal resource occurs in each of the positive integer number of frequency-domain region(s), and any of the positive integer number of frequency-domain region(s) comprises a positive integer number of consecutive subcarriers.

In one embodiment, the first subband is divided into a positive integer number of frequency-domain region(s), the second reference signal resource only occurs in part of the positive integer number of frequency-domain region(s), and any of the positive integer number of frequency-domain region(s) comprises a positive integer number of consecutive subcarriers.

Embodiment 13

Figure 13:
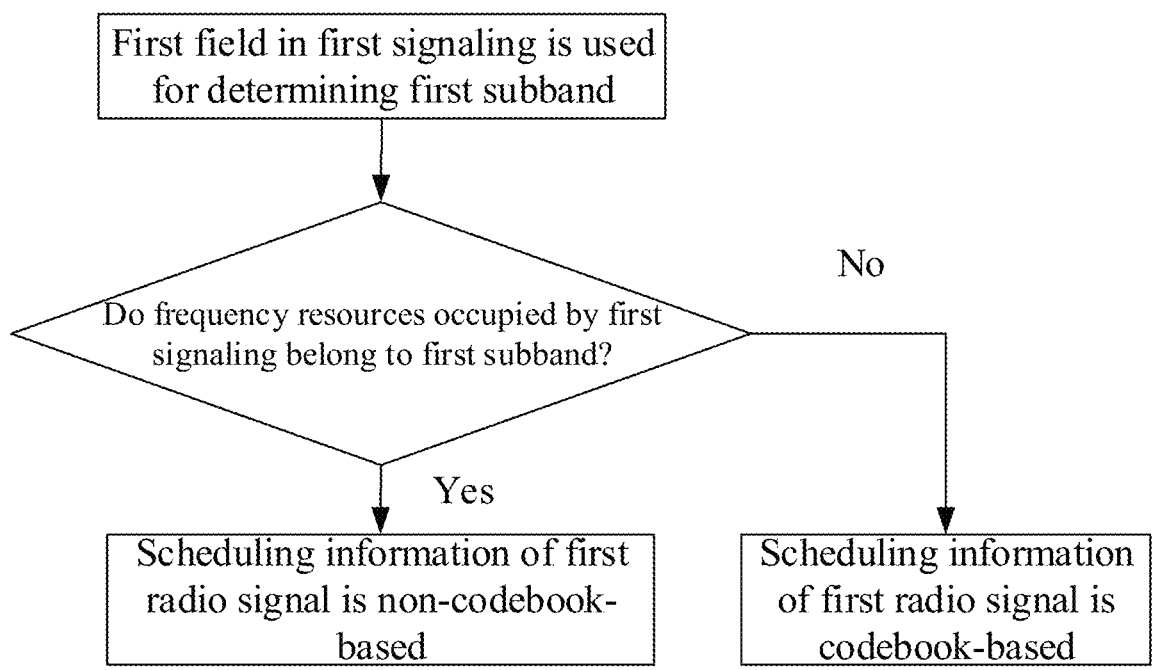
FIG. 13 illustrates a schematic diagram of a relation between whether scheduling information of a first radio signal is non-codebook-based or codebook-based and a first field in a first signaling according to one embodiment of the present disclosure.

Embodiment 13 illustrates a schematic diagram of a relationship between whether scheduling information of a first radio signal is non-codebook-based or codebook-based and a first field in a first signaling, as shown in FIG. 13.

In Embodiment 13, the first field in the first signaling is used for determining the first subband in the present disclosure, and whether the scheduling information of the first radio signal is non-codebook-based or codebook-based is related to whether frequency resources occupied by the first signaling belong to the first subband. When frequency resources occupied by the first signaling belong to the first subband, the scheduling information of the first radio signal is non-codebook-based; and when frequency resources occupied by the first signaling does not belong to the first subband, the scheduling information of the first radio signal is codebook-based.

In one embodiment, the first field in the first signaling comprises part or all of information in a Carrier indicator field; and the specific meaning of Carrier indicator field can be found in 3GPP TS38.212, section 7.3.

In one embodiment, the first field in the first signaling comprises part or all of information in a Bandwidth part indicator field; and the specific meaning of Bandwidth part indicator field can be found in 3GPP TS38.212, section 7.3.

In one embodiment, the first field in the first signaling comprises part or all of information in a Carrier indicator field and a Bandwidth part indicator field.

In one embodiment, a number of bit(s) comprised in the first field in the first signaling belongs to 1, 2, 3, 4 and 5.

In one embodiment, when frequency resources occupied by the first signaling belong to the first subband, the scheduling information of the first radio signal is non-codebook-based; and when frequency resources occupied by the first signaling does not belong to the first subband, the scheduling information of the first radio signal is codebook-based.

Embodiment 14

Figure 14:
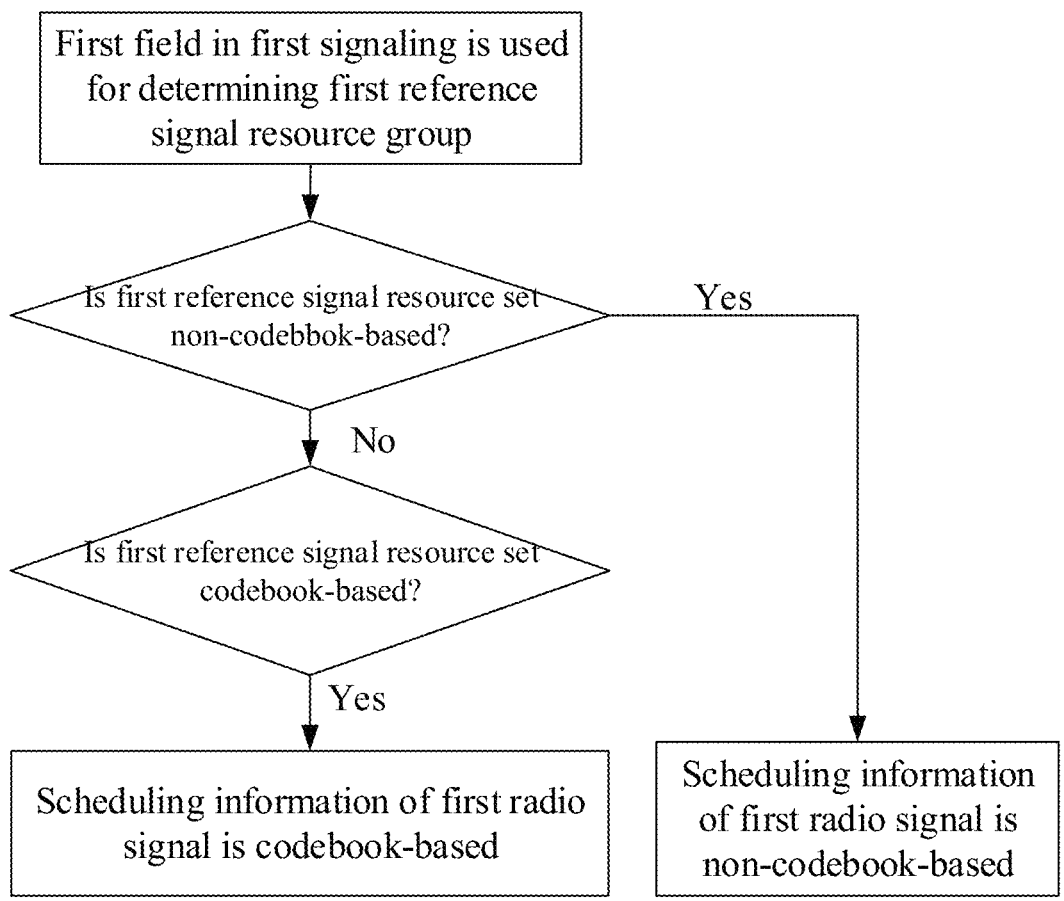
FIG. 14 illustrates a schematic diagram of a relation between whether scheduling information of a first radio signal is non-codebook-based or codebook-based and a first field in a first signaling according to one embodiment of the present disclosure.

Embodiment 14 illustrates a schematic diagram of a relationship between whether scheduling information of a first radio signal is non-codebook-based or codebook-based and a first field in a first signaling, as shown in FIG. 14.

In Embodiment 14, the first field in the first signaling is used for determining the first reference-signal-resource group in the present disclosure, and the first reference-signal-resource group comprises K1 first-type reference signal resource(s); the first reference-signal-resource group is a subset of a first reference-signal-resource set, and the first reference-signal-resource set comprises K first-type reference signal resource(s); the K1 is a positive integer, and the K is a positive integer no less than the K1; whether the scheduling information of the first radio signal is non-codebook-based or codebook-based is related to whether the first reference-signal-resource set is non-codebook-based or codebook-based. When the first reference-signal-resource set is non-codebook-based, the scheduling information of the first radio signal is non-codebook-based; and when the first reference-signal-resource set is codebook-based, the scheduling information of the first radio signal is codebook-based.

In one embodiment, the first field in the first signaling comprises part or all of information in an SRS resource indicator field; and the specific meaning of SRS resource indicator field can be found in 3GPP TS38.212, section 7.3.

In one embodiment, a number of bit(s) comprised in the first field in the first signaling belongs to 1, 2, 3 and 4.

In one embodiment, the first reference-signal-resource set being non-codebook-based means that a higher-layer parameter srsSetUse associated with the first reference-signal-resource set is configured as nonCodebook.

In one embodiment, the first reference-signal-resource set being non-codebook-based means that a transmitting antenna port group of the first-type reference signal is determined by the UE itself according to a measurement performed on the second-type reference signal.

In one embodiment, the first reference-signal-resource set being non-codebook-based means that a Spatial Domain Transmission Filter corresponding to the first-type reference signal is determined by the UE itself in the present disclosure according to a measurement performed on the second-type reference signal.

In one embodiment, the first reference-signal-resource set being codebook-based means that a higher-layer parameter srsSetUse associated with the first reference-signal-resource set is configured as Codebook.

In one embodiment, the first reference-signal-resource set being codebook-based means that a first codeword is used for determining a transmitting antenna port group of the first-type reference signal, the first codeword is one codeword in a first codebook, the first codebook comprising a positive integer number of codeword(s), and any codeword in the first codebook is a matrix or vector. The specific meaning of codeword and codebook can be found in 3GPP TS36.211, section 6.3 or 3GPP TS38.211, section 6.3.

In one subembodiment of the above embodiment, the first codeword is specified by a transmitter of the first signaling.

In one embodiment, the first reference-signal-resource set being codebook-based means that the first codeword is used for determining a Spatial Domain Transmission Filter corresponding to the first-type reference signal.

In one embodiment, the first reference-signal-resource set being codebook-based means that a transmitting antenna port group of the first-type reference signal is specified by a transmitter of the first signaling.

In one embodiment, the first reference-signal-resource set being codebook-based means that a Spatial Domain Transmission Filter corresponding to the first-type reference signal is specified by a transmitter of the first signaling.

In one embodiment, the specific meaning of the higher-layer parameter srsSetUse can be found in 3GPP TS38. 214, section 6 and 3GPP TS38. 331.

In one embodiment, the higher-layer parameter srsSetUse is one field in an SRS-Config IE.

In one embodiment, the higher-layer parameter srsSetUse is one field in second downlink information, and the second downlink information comprises part or all of information of an SRS-Config IE.

In one subembodiment of the above embodiment, the second downlink information is an SRS-Config IE.

In one subembodiment of the above embodiment, the second downlink information comprises part or all of information of one or multiple fields in an SRS-Config IE.

In one subembodiment of the above embodiment, the second downlink information comprises part or all of information of an SRS-ResourceSet field in an SRS-Config IE; and the specific meaning of the SRS-ResourceSet field can be found in 3GPP TS38.331.

In one subembodiment of the above embodiment, the second downlink information indicates the first reference-signal-resource set.

In one subembodiment of the above embodiment, the second downlink information comprises a fifth field and a sixth field, the fifth field in the second downlink information indicates the first reference-signal-resource set, and the sixth field in the second downlink information is a srsSetUse.

In one subembodiment of the above embodiment, third downlink information is used for determining Q1 first-type reference signal(s) and Q1 first index(es), and each of the Q1 first-type reference signal(s) respectively corresponds to each of the Q1 first index(es), the Q1 being a positive integer no less than the K. The fifth field in the second downlink information indicates K first index(es) of the Q1 first index (es), and first-type reference signal resource(s) of the Q1 first-type reference signal resource(s) corresponding to the K first index(es) consists(consist) the first reference-signal-resource set.

In one reference embodiment of the above subembodiment, the third downlink information comprises part or all of information of an SRS-Config IE.

In one reference embodiment of the above subembodiment, the third downlink information comprises part or all of information of one or multiple fields in an SRS-Config IE.

In one reference embodiment of the above subembodiment, the third downlink information comprises part or all of information of an SRS-Resource field in an SRS-Config IE; and the specific meaning of the SRS-Resource field can be found in 3GPP TS38.331.

In one embodiment, the specific diagram of SRS-Config IE can be found in 3GPP TS38.331.

Embodiment 15

Figure 15:
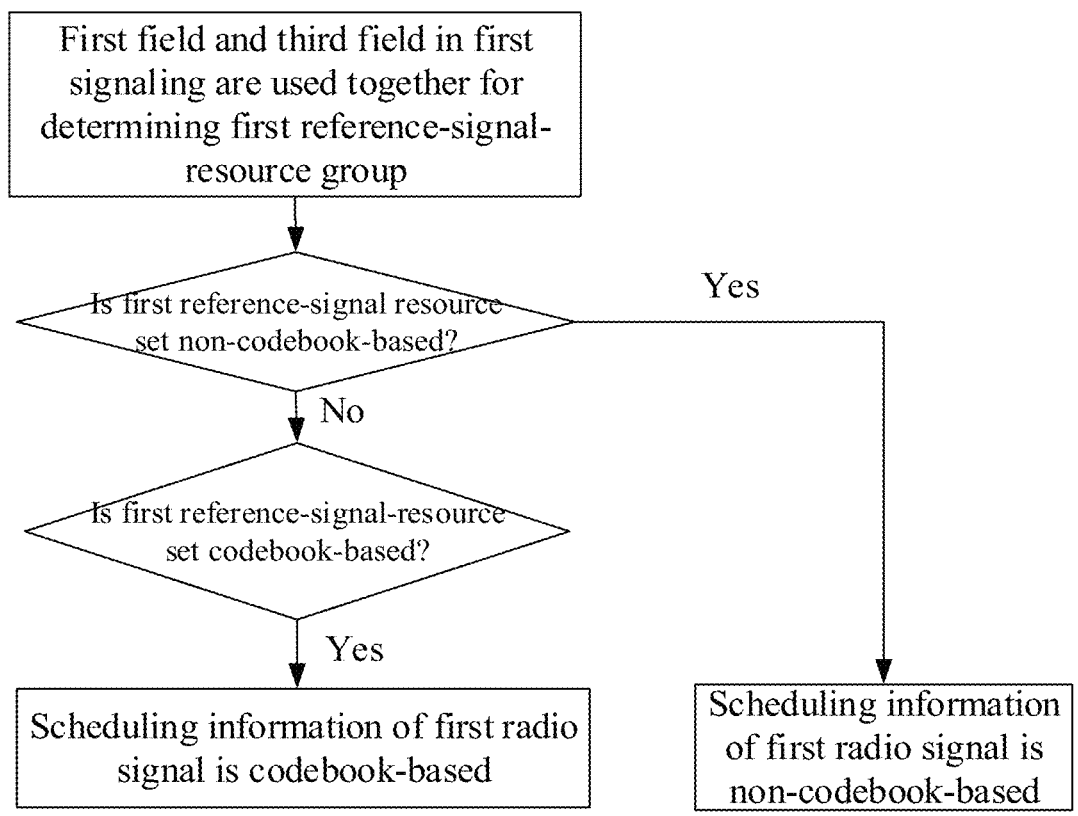
FIG. 15 illustrates a schematic diagram of a relationship between whether scheduling information of a first radio signal is non-codebook-based or codebook-based and a first field in a first signaling according to one embodiment of the present disclosure.

Embodiment 15 illustrates a schematic diagram of a relationship between whether scheduling information of a first radio signal is non-codebook-based or codebook-based and a first field in a first signaling, as shown in FIG. 15.

In Embodiment 15, the first field in the first signaling is used for determining the first subband in the present disclosure; the first signaling comprises a third field, the third field in the first signaling is used for determining the first reference-signal-resource group in the present disclosure; whether the scheduling information of the first radio signal is non-codebook-based or codebook-based is related to both the first field in the first signaling and the third field in the first signaling. The first field in the first signaling and the third field in the first signaling are used together for determining the first reference-signal-resource group. The first reference-signal-resource group is a subset of the first reference-signal-resource set in the present disclosure. When the first reference-signal-resource set is non-codebook-based, the scheduling information of the first radio signal is non-codebook-based; and when the first reference-signal-resource set is codebook-based, the scheduling information of the first radio signal is codebook-based.

In one embodiment, the first field in the first signaling and the third field in the first signaling are used together for determining the first reference-signal-resource group.

In one embodiment, the first reference-signal-resource set is one of M1 reference-signal-resource sets, and any of the M1 reference-signal-resource sets comprises a positive integer number of first-type reference signal resource(s). Any of the M1 reference-signal-resource sets corresponds to one of the M subbands in the present disclosure. The first field in the first signaling is used for determining M2 reference-signal-resource set(s) out of the M1 reference-signal-resource sets, and the M2 reference-signal-resource set(s) consists(consist) of reference-signal resource-set(s) in the M1 reference-signal-resource sets corresponding to the first subband in the present disclosure; the third field in the first signaling is used for determining the first reference-signal-resource group out of the M2 reference signal resource(s). The M1 is a positive integer greater than the M in the present disclosure, and the M2 is a positive integer less than the M1.

In one subembodiment of the above embodiment, there does not exist one reference-signal-resource set in the M1 reference-signal-resource sets corresponding to two of the M subbands simultaneously.

In one subembodiment of the above embodiment, for any given subband in the M subbands, there at least exists one reference-signal-resource set in the M1 reference-signal-resource sets corresponding to the any given subband.

In one subembodiment of the above embodiment, there at least exists one subband in the M subbands corresponding to multiple reference-signal-resource sets in the M1 reference-signal-resource sets.

In one subembodiment of the above embodiment, any of the M1 reference-signal-resource sets corresponding to one of the M subbands means that frequency resources occupied by any of the M1 reference-signal-resource sets belong to one of the M subbands.

In one subembodiment of the above embodiment, the M2 is greater than 1.

In one subembodiment of the above embodiment, the M2 is equal to 1.

Embodiment 16

Figure 16:
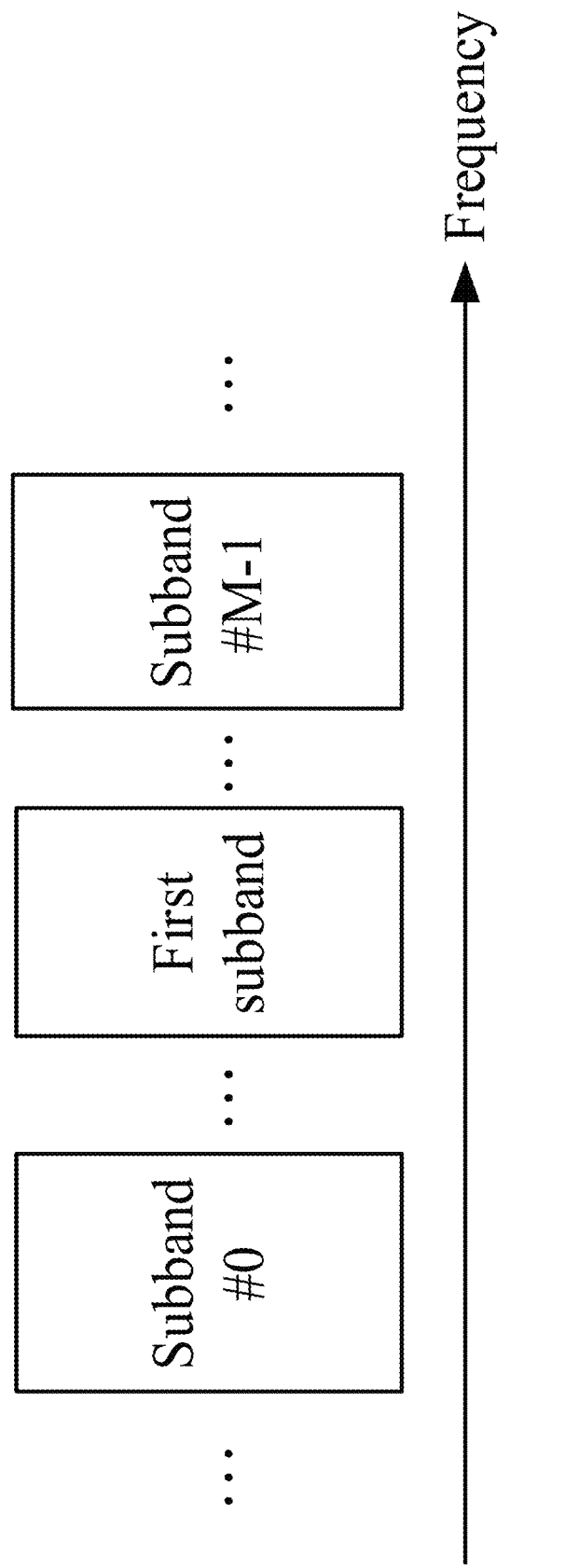
FIG. 16 illustrates a schematic diagram of M subbands being distributed in frequency domain according to one embodiment of the present disclosure.

Embodiment 16 illustrates a schematic diagram of M subbands being distributed in frequency domain, as shown in FIG. 16.

In Embodiment 16, the first subband in the present disclosure is one of the M subbands, the M being a positive integer greater than 1. The M subbands occupies two mutually-orthogonal (non-overlapping) frequency resources in frequency domain. In FIG. 16, indexes of the M subbands are respectively #0, . . . , #M−1.

In one embodiment, any subband of the M subbands is deployed at Unlicensed Spectrum.

In one embodiment, there at least exists one subband of the M subbands being deployed at Licensed Spectrum.

In one embodiment, there at least exists one subband of the M subbands being deployed at Unlicensed Spectrum.

In one embodiment, any subband of the M subbands comprises one or multiple Carriers.

In one embodiment, any subband of the M subbands comprises one or multiple BWPs in a carrier.

In one embodiment, any subband of the M subbands comprises a positive integer number of consecutive subcarriers.

In one embodiment, carrier frequency of the M subbands consists of a subset of a carrier frequency set, and the specific meaning of the carrier frequency set can be found in 3GPP TS36. 104, section 5. 7. 4.

In one embodiment, the M subbands comprise one subband other than the first subband.

In one embodiment, the M subbands consist of a Carrier, and any of the M subbands is a BWP in the carrier.

In one embodiment, the M subbands belong to a given Carrier, and the given carrier corresponds to a serving cell.

In one embodiment, the M subbands correspond to a serving cell.

In one embodiment, there exists a protection interval in frequency domain between any two of the M subbands adjacent in frequency domain.

Embodiment 17

Figure 17:
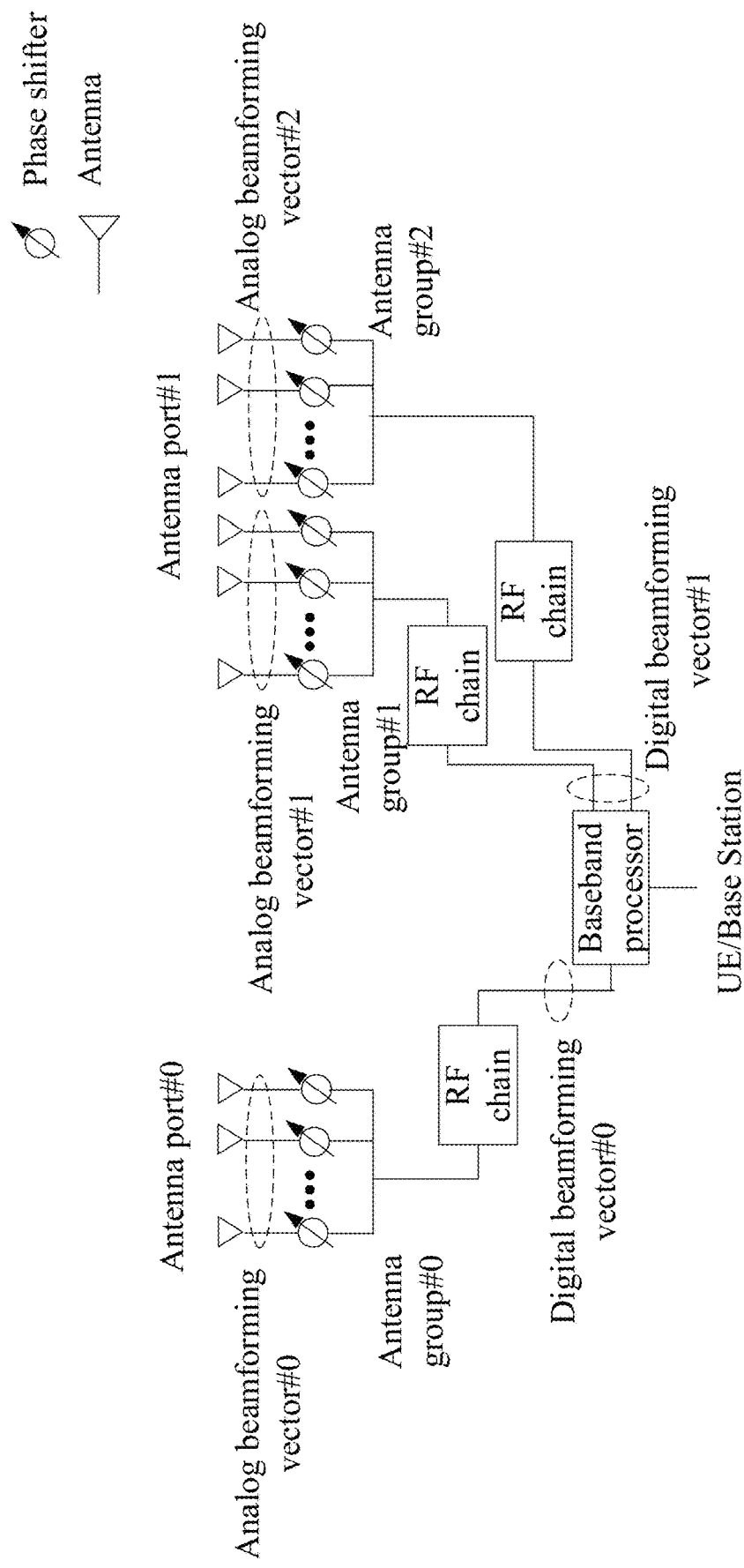
FIG. 17 illustrates a schematic diagram of antenna ports and antenna port sets according to one embodiment of the present disclosure.

Embodiment 17 illustrates a schematic diagram of an antenna port and an antenna port group, as shown in FIG. 17.

In Embodiment 17, an antenna port group comprises a positive integer number of antenna port(s); one antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) comprised in the given antenna port are arranged diagonally to form an analog beamforming matrix corresponding to the given antenna port. Mapping coefficients from the positive integer number of antenna group(s) comprised in the given antenna port to the given antenna port constitute a digital beamforming vector corresponding to the given antenna port. A beamforming vector corresponding to the given antenna port is acquired as a product of the analog beamforming matrix and the digital beamforming vector corresponding to the given antenna port.

FIG. 17 illustrates two antenna ports, namely, antenna port #0 and antenna port #1. Herein, the antenna port #0 consists of antenna group #0, and the antenna port #1 consists of antenna group #1 and antenna group #2. Mapping coefficients from multiple antennas of the antenna group #0 to the antenna port #0 constitute an analog beamforming vector #0; mapping coefficients from the antenna group #0 to the antenna port #0 constitute a digital beamforming vector #0; a beamforming vector corresponding to the antenna port #0 is acquired as a product of the analog beamforming vector #0 and the digital beamforming vector #0. Mapping coefficients from multiple antennas of the antenna group #1 and multiple antennas of the antenna group #2 to the antenna port #1 respectively constitute an analog beamforming vector #1 and an analog beamforming vector #2; and mapping coefficients from the antenna group #1 and the antenna group #2 to the antenna port #1 constitute a digital beamforming vector #1. A beamforming vector corresponding to the antenna port #1 is acquired as a product of an analog beamforming matrix formed by the analog beamforming vector #1 and the analog beamforming vector #2 arranged diagonally and the digital beamforming vector #1.

In one embodiment, an antenna port only comprises one antenna group, i.e., one RF chain, for instance, the antenna port #0 in FIG. 17.

In one subembodiment of the above embodiment, the analog beamforming matrix corresponding to the one antenna port is subjected to dimensionality reduction to form an analog beamforming vector, and the digital beamforming vector corresponding to the one antenna port is subjected to dimensionality reduction to form a scaler, a beamforming vector corresponding to the one antenna port is equal to an analog beamforming vector corresponding thereto. For example, the antenna port #0 in FIG. 17 only comprises the antenna group #0, the digital beamforming vector #0 in FIG. 17 is subjected to dimensionality reduction to form a scaler, a beamforming vector corresponding to the antenna port #0 is the analog beamforming vector #0.

In one embodiment, one antenna port comprises a plurality of antenna groups, that is, a plurality of RF chains, for example, the antenna port #1 in FIG. 17.

In one embodiment, the specific meaning of the antenna port can be found in 3GPP TS36.211, section 5.2 and 6.2, or 3GPP TS38.211, section 4.4.

In one embodiment, a small-scale channel parameter that a radio signal transmitted from one antenna port goes through can be used for inferring a small-scale channel parameter of the other radio signal transmitted from the one antenna port goes through.

In one subembodiment of the above embodiment, the small-scale channel parameter includes one or more of Channel Impulse Response (CIR), a Precoding Matrix Indicator (PMI), a Channel Quality Indicator (CQI), and a Rank Indicator (RI).

In one embodiment, two antennas being Quasi Co-Located (QCL) means that all or part of large-scale properties of a radio signal transmitted by one of the two antenna ports can be used for inferring all or part of large-scale properties of a radio signal transmitted by the other one of the two antenna ports.

In one embodiment, the large-scale properties of a radio signal include one or more of delay spread, Doppler spread, Doppler shift, average gain, average delay, and spatial Rx parameters.

In one embodiment, Spatial Rx parameters include one or more of a receiving beam, a receiving analog beamforming matrix, a receiving analog beamforming vector, a receiving digital beamforming vector, a receiving beamforming vector and a Spatial Domain Receive Filter.

In one embodiment, the specific meaning of the QCL can be found in 3GPP TS36.211, section 6.2, 3GPP TS38.211, section 4.4 or 3GPP TS38.214, section 5. 1. 5.

In one embodiment, a QCL type between two antenna ports being QCL-TypeD means that Spatial Rx parameters of a radio signal transmitted from the one antenna port can be used for inferring Spatial Rx parameters of a radio signal transmitted from the other antenna port.

In one embodiment, a QCL type between two antenna ports being QCL-TypeD means that a radio signal transmitted by the one antenna port and a radio signal transmitted by the other one antenna port can be received with same Spatial Rx parameters.

In one embodiment, the specific meaning of the QCL-TypeD can be found in 3GPP TS38.214, section 5.1.5.

Embodiment 18

Figure 18:
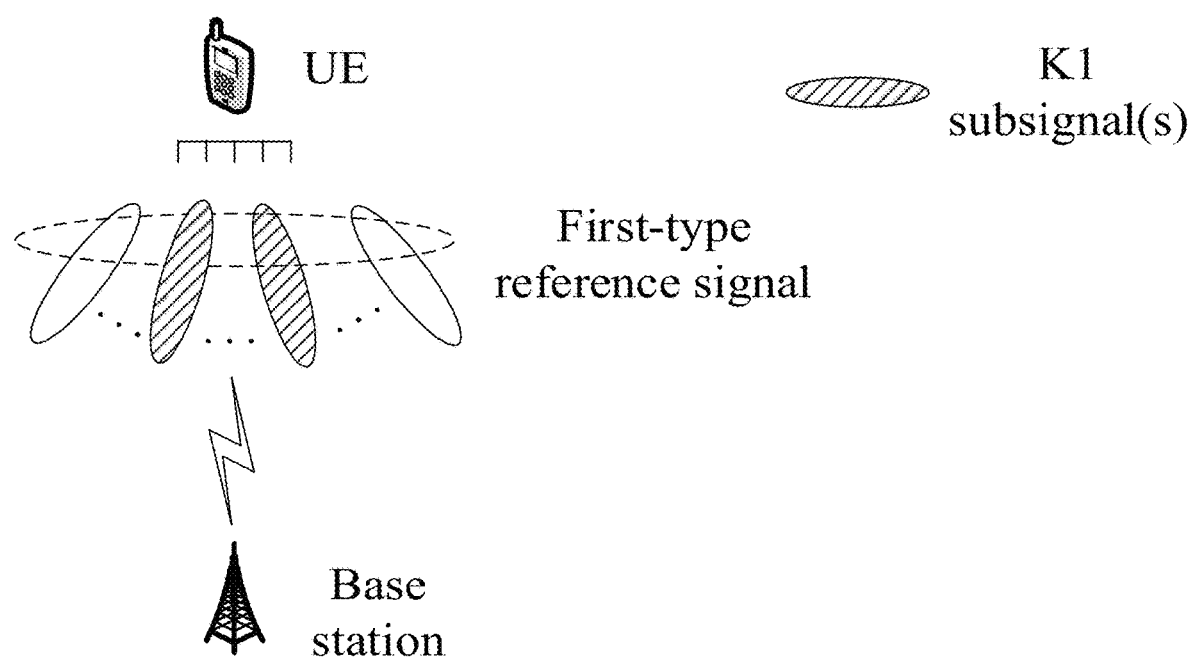
FIG. 18 illustrates a schematic diagram of a measurement performed on a first-type reference signal being used for determining scheduling information of a first radio signal according to one embodiment of the present disclosure.

Embodiment 18 illustrates a schematic diagram of a measurement performed on a first-type reference signal being used for determining scheduling information of a first radio signal, as shown in FIG. 18.

In Embodiment 18, the first-type reference signal is transmitted in the first-type reference-signal-resource set in the first subband in the present disclosure, a measurement performed on the first-type reference signal is used for determining the scheduling information of the first radio signal, and the first reference-signal-resource set comprises K first-type reference signal resource(s). The first reference-signal-resource group in the present disclosure is a subset of the first reference-signal-resource set, and the first reference-signal-resource group comprises K1 first-type reference signal resource(s), the K1 being a positive integer, the K being a positive integer no less than the K1. The first-type reference signal comprises K subsignal(s), and the K subsignal(s) is(are) respectively transmitted in the K first-type reference signal resource(s). The K subsignal(s) is(are) respectively transmitted by K antenna port group(s), and any group of the K antenna port group(s) comprises a positive integer number of antenna port(s). K1 antenna port group(s) is(are) antenna port group(s) in the K antenna port group(s) respectively used for transmitting K1 subsignal(s), and the K1 subsignal(s) is(are) subsignal(s) of the K subsignal(s) respectively transmitted in the K1 first-type reference signal resource(s). A measurement(measurements) performed on the K1 subsignal(s) is(are) used for determining the scheduling information of the first radio signal.

In FIG. 18, a solid ellipse represents the K subsignal(s), and a solid ellipse filled with left slashes represent the K1 subsignal(s).

In one embodiment, the first reference-signal-resource set is reserved for the first-type reference signal.

In one embodiment, the scheduling information of the first radio signal is non-codebook-based.

In one embodiment, a measurement performed on the first-type reference signal is used for determining one or more of MCS, a transmitting antenna port group and a corresponding Spatial Domain Transmission Filter of the first radio signal; and a transmitting antenna port group of the first radio signal comprises a positive integer number of antenna port(s).

In one embodiment, a measurement performed on the first-type reference signal is used for determining the first reference-signal-resource group.

In one embodiment, a measurement(measurements) performed on the K subsignal(s) is(are) respectively used for determining K received quality(qualities), and the K1 subsignal(s) corresponds(correspond) to largest K1 received quality(qualities) of the K received quality(qualities).

In one subembodiment of the above embodiment, each of the K received quality(qualities) is Reference Signal Received Power (RSRP).

In one subembodiment of the above embodiment, each of the K received quality(qualities) is Reference Signal Received Quality (RSRQ).

In one subembodiment of the above embodiment, each of the K received quality(qualities) is CQI.

In one subembodiment of the above embodiment, each of the K received quality(qualities) is a Signal-to-Noise Ratio (SNR).

In one subembodiment of the above embodiment, each of the K received quality(qualities) is Signal-to-Interference plus Noise Ratio (SINR).

In one embodiment, a measurement performed on the first-type reference signal is used for determining the K1.

In one embodiment, the K1 antenna port group(s) is(are) used for determining a transmitting antenna port group of the first radio signal.

In one embodiment, a transmitting antenna port group of the first radio signal is independent of the second field in the first signaling in the present disclosure.

In one embodiment, the first radio signal comprises K1 first subsignal(s), and the K1 subsignal(s) is(are) respectively transmitted by the K1 antenna port group(s).

In one embodiment, the first radio signal comprises K1 first subsignal(s), and Spatial Domain Transmission Filter(s) corresponding to the K1 first subsignal(s) is(are) respectively Spatial Domain Transmission Filter(s) corresponding to the K1 antenna port group(s).

In one embodiment, the K1 is a positive integer no greater than 4.

In one embodiment, any group of the K antenna port group(s) only comprises one antenna port.

In one embodiment, any two antenna ports in the K antenna port group(s) are QCL.

In one embodiment, a QCL type between any two antenna ports in the K antenna port group(s) is QCL-TypeD.

In one embodiment, there at least exist two of antenna ports in the K antenna port group(s) being not QCL.

In one embodiment, different antenna ports in the K antenna port group(s) consist of a same antenna group.

In one embodiment, there at least exist two antenna ports in the K antenna port group(s) consisting of different antenna groups.

In one embodiment, different antenna ports in the K antenna port group(s) correspond to different beamforming vectors.

In one embodiment, different antenna ports in the K antenna port group(s) correspond to a same analog beamforming matrix.

In one embodiment, different antenna ports in the K antenna port group(s) correspond to different digital beamforming vectors.

In one embodiment, there at least exist two antenna ports in the K antenna port group(s) corresponding to different analog beamforming matrices.

Embodiment 19

Figure 19:
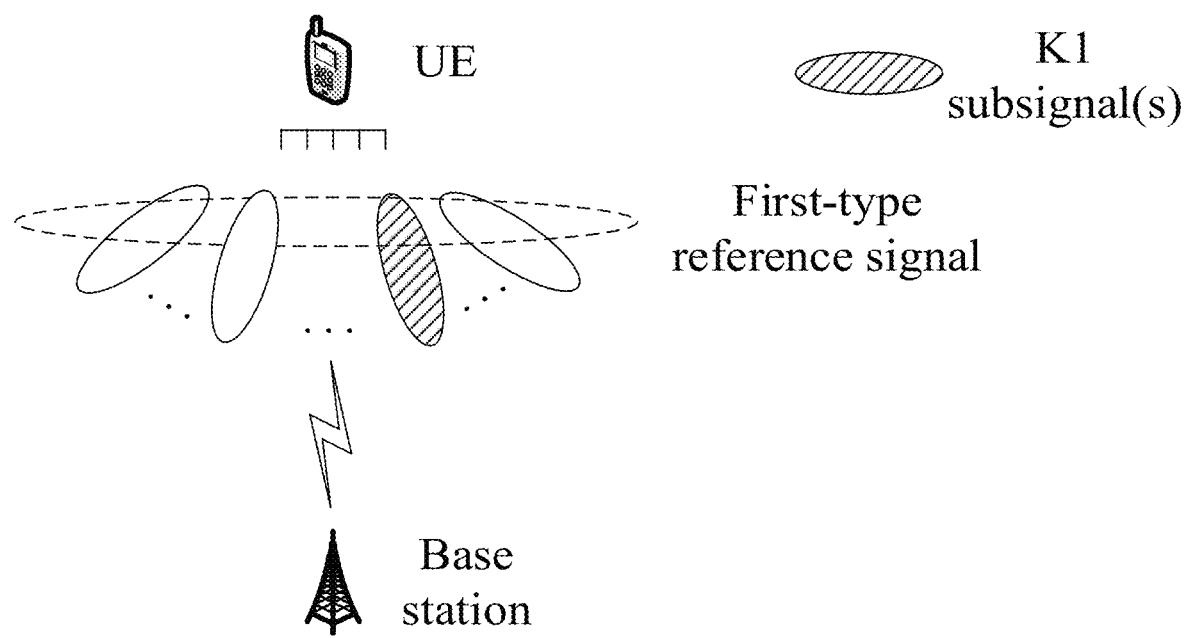
FIG. 19 illustrates a schematic diagram of a measurement performed on a first-type reference signal being used for determining scheduling information of a first radio signal according to one embodiment of the present disclosure.

Embodiment 19 illustrates a schematic diagram of a measurement performed on a first-type reference signal being used for determining scheduling information of a first radio signal, as shown in FIG. 19.

In Embodiment 19, the first-type reference signal is transmitted in the first-type reference-signal-resource set in the first subband in the present disclosure, a measurement performed on the first-type reference signal is used for determining the scheduling information of the first radio signal, and the first reference-signal-resource set comprises K first-type reference signal resource(s). The first reference-signal-resource group in the present disclosure is a subset of the first reference-signal-resource set, and the first reference-signal-resource group comprises K1 first-type reference signal resource(s), the K1 being a positive integer, the K being a positive integer no less than the K1. The first-type reference signal comprises K subsignal(s), and the K subsignal(s) is(are) respectively transmitted in the K first-type reference signal resource(s). The K subsignal(s) is(are) respectively transmitted by K antenna port group(s), and any group of the K antenna port group(s) comprises a positive integer number of antenna port(s). K1 antenna port group(s) is(are) antenna port group(s) in the K antenna port group(s) respectively used for transmitting K1 subsignal(s), and the K1 subsignal(s) is(are) subsignal(s) of the K subsignal(s) respectively transmitted in the K1 first-type reference signal resource(s). A measurement(measurements) performed on the K1 subsignal(s) is(are) used for determining the scheduling information of the first radio signal.

In FIG. 19, a solid ellipse represents the K subsignal(s), and a solid ellipse filled with left slashes represent the K1 sub signal(s).

In one embodiment, the scheduling information of the first radio signal is codebook-based.

In one embodiment, the K1 is equal to 1.

In one embodiment, the K1 antenna port group(s) consists (consist) of L antenna ports, the L being a positive integer greater than 1.

In one embodiment, at least one transmitting antenna port of the first radio signal and at least one antenna port of the K1 antenna port group(s) are QCL.

In one embodiment, a QCL type between at least one transmitting antenna port of the first radio signal and at least one antenna port of the K1 antenna port group(s) is QCL-TypeD.

In one embodiment, any transmitting antenna port of the first radio signal and any antenna port of the K1 antenna port group(s) are QCL.

In one embodiment, a QCL type between any transmitting antenna port of the first radio signal and any antenna port of the K1 antenna port group(s) is QCL-TypeD.

In one embodiment, the scheduling information of the first radio signal is codebook-based, and a measurement performed on the first-type reference signal is used for determining the second field in the first signaling in the present disclosure.

In one embodiment, the second field in the first signaling and the K1 antenna port group(s) are used together for determining a transmitting antenna port group of the first radio signal.

In one embodiment, the second field in the first signaling indicates a first codeword, the first codeword being a matrix, and the first codeword is used for the L antenna ports to form a transmitting antenna port group of the first radio signal.

In one embodiment, a transmitting antenna port group of the first radio signal comprises N antenna port(s); the second field in the first signaling indicates a first codeword, the first codeword consists of N first precoding vector(s), and a number of elements in any vector of the N first precoding vector(s) is equal to the L. The N first precoding vector(s) is(are) respectively used for the L antenna ports to obtain the N antenna port(s).

In one subembodiment of the above embodiment, each of the N first precoding vector(s) respectively corresponds to each of the N antenna port(s). For any given antenna port of the N antenna port(s), the any given antenna port is obtained by weighting the L antenna ports respectively by L elements in a first precoding vector corresponding to the any given antenna port.

In one embodiment, the first codeword is one codeword in a first codebook, the first codebook comprises a positive integer number of codeword(s), and any codeword in the first codebook is a matrix or a vector.

In one embodiment, any group of the K antenna port groups comprises a plurality of antenna ports.

In one embodiment, any two antenna ports of any group of the K antenna port group(s) are QCL.

In one embodiment, a QCL type between any two antenna ports of any group of the K antenna port group(s) is QCL-TypeD.

In one embodiment, different antenna ports of any group of the K antenna port group(s) consist of a same antenna group.

In one embodiment, different antenna ports of any group of the K antenna port group(s) correspond to a same analog beamforming matrix.

In one embodiment, different antenna ports of any group of the K antenna port group(s) correspond to different digital beamforming vectors.

In one embodiment, all antenna ports in a transmitting antenna port group of the first radio signal consist of a same antenna group.

In one embodiment, all antenna ports of a transmitting antenna port group of the first radio signal correspond to a same analog beamforming matrix.

In one embodiment, the K1 antenna port group(s) is(are) used for determining an analog beamforming matrix corresponding to each antenna port of a transmitting antenna port group of the first radio signal.

In one embodiment, an analog beamforming matrix corresponding to each antenna port of a transmitting antenna port group of the first radio signal is an analog beamforming matrix corresponding to any antenna port of the K1 antenna port group(s).

In one embodiment, the first codeword is used for determining a digital beamforming matrix corresponding to each antenna port of a transmitting antenna port group of the first radio signal.

Embodiment 20

Figure 20:
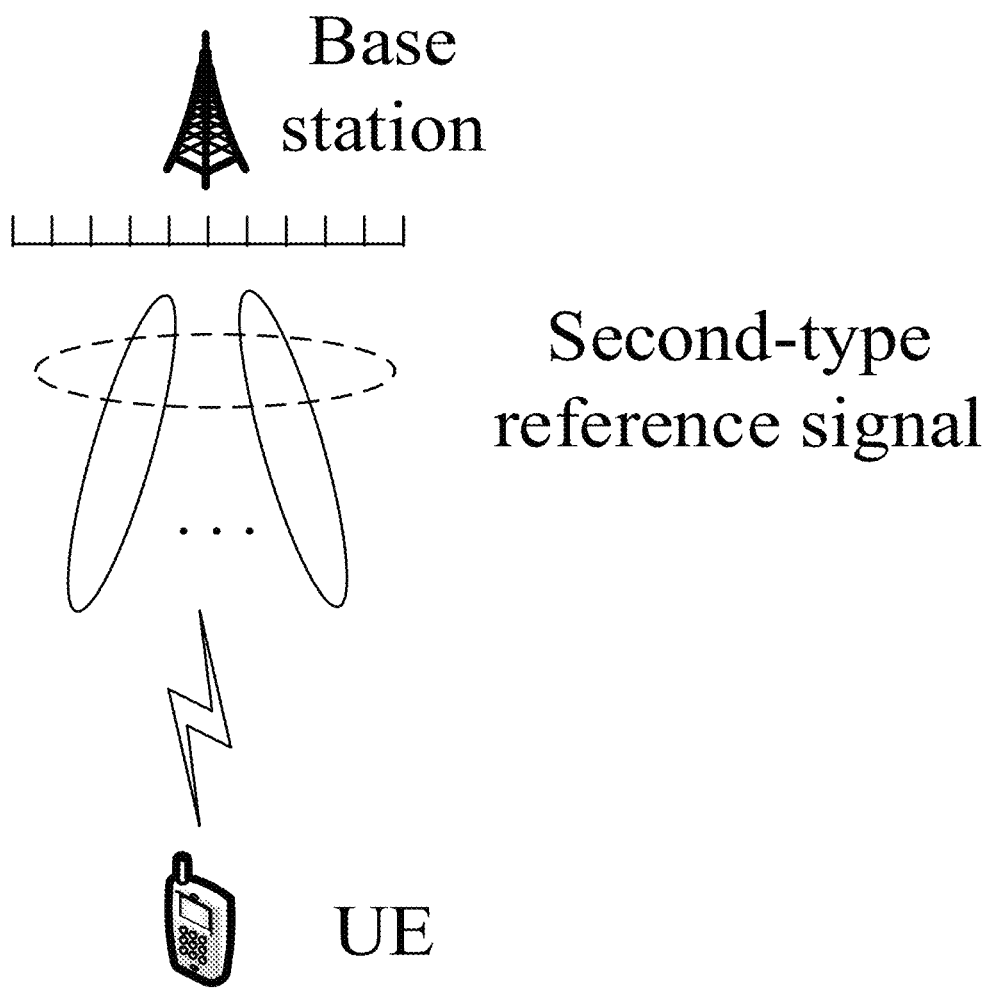
FIG. 20 illustrates a schematic diagram of a measurement performed on a second-type reference signal being used for determining a transmitting antenna port group of a first-type reference signal according to one embodiment of the present disclosure.

Embodiment 20 illustrates a schematic diagram of a measurement performed on a second-type reference signal being used for determining a transmitting antenna port group of a first-type reference signal, as shown in FIG. 20.

In Embodiment 20, the scheduling information of the first radio signal in the present disclosure is non-codebook-based. A measurement performed on the first-type reference signal is used for determining the scheduling information of the first radio signal, and a measurement performed on the second-type reference signal is used for determining a transmitting antenna port group of the first-type reference signal, the transmitting antenna port group of the first-type reference signal comprising a positive integer number of antenna port(s). The first-type reference signal is transmitted in the first reference-signal-resource set in the present disclosure, and the second-type reference signal is transmitted in the second reference signal resource in the present disclosure.

In one embodiment, a measurement performed on the second-type reference signal being used for determining a transmitting antenna port group of the first-type reference signal means that spatial Rx parameters corresponding to the second-type reference signal are used for determining a transmitting antenna port group of the first-type reference signal.

In one embodiment, a measurement performed on the second-type reference signal being used for determining a transmitting antenna port group of the first-type reference signal means that spatial Rx parameters corresponding to the second-type reference signal are used for determining a beamforming vector corresponding to each antenna port of a transmitting antenna port group of the first-type reference signal.

In one embodiment, a measurement performed on the second-type reference signal being used for determining a transmitting antenna port group of the first-type reference signal means that spatial RX parameters corresponding to the second-type reference signal are used for determining a Spatial Domain Transmission Filter corresponding to the first-type reference signal.

In one embodiment, a measurement performed on the second-type reference signal being used for determining a transmitting antenna port group of the first-type reference signal means that a Spatial Domain Receive Filter corresponding to the second-type reference signal is used for determining a Spatial Domain Transmission Filter corresponding to the first-type reference signal.

In one embodiment, a measurement performed on the second-type reference signal being used for determining a transmitting antenna port group of the first-type reference signal means that a Spatial Domain Receive Filter corresponding to the second-type reference signal is used as a Spatial Domain Transmission Filter corresponding to the first-type reference signal.

In one embodiment, a transmitting antenna port group of the first-type reference signal comprises K2 antenna port(s), the K2 being a positive integer. A measurement performed on the second-type reference signal is used for determining K2 beamforming vector(s); the K2 beamforming vector(s) is(are) subset(s) of K3 beamforming vectors, the K3 being a positive integer greater than the K2. A received quality obtained by the UE receives the second-type reference signal with any vector of the K2 beamforming vector(s) is higher than a received quality obtained by the UE receives the second-type reference signal with any vector not belonging to the K2 beamforming vector(s) in the K3 beamforming vectors. The K2 beamforming vector(s) is(are) used as beamforming vector(s) corresponding to the K2 antenna port(s).

In one embodiment, the second reference signal resource is reserved for the second-type reference signal.

In one embodiment, the second reference signal resource is associated with the first reference-signal-resource set.

In one embodiment, fourth downlink information is used for determining the first reference-signal-resource set and the second reference signal resource; and the fourth downlink information comprises part or all of information in an SRS-Config IE.

In one subembodiment of the above embodiment, the fourth downlink information is an SRS-Config IE.

In one subembodiment of the above embodiment, the fourth downlink information comprises part or all of information of one or multiple fields in an SRS-Config IE.

In one subembodiment of the above embodiment, the fourth downlink information comprises part or all of information of an SRS-ResourceSet field in an SRS-Config IE; and the specific meaning of the SRS-ResourceSet field can be found in 3GPP TS38.331.

In one subembodiment of the above embodiment, the fourth information indicates the first reference-signal-resource set and the second reference signal resource.

In one subembodiment of the above embodiment, the fourth downlink information comprises a seventh field and an eighth field, the seventh field in the fourth downlink information indicates the first reference-signal-resource set, and the eighth field in the fourth downlink information indicates the second reference signal resource.

In one subembodiment of the above embodiment, third downlink information is used for determining Q1 first-type reference signal(s) and Q1 first index(es), and each of the Q1 first-type reference signal(s) respectively corresponds to each of the Q1 first index(es), the Q1 being a positive integer no less than the K in the present disclosure. Fifth downlink information is used for determining Q2 second-type reference signal resource(s) and Q2 second index(es), each of the Q2 second-type reference signal resource(s) respectively corresponds to each of the Q2 second index(es), the Q2 being a positive integer. The seventh field in the fourth downlink information indicates K first index(es) of the Q1 first index(es), and first-type reference signal resource(s) of the Q1 first-type reference signal resource(s) corresponding to the K first index(es) consists(consist) the first reference-signal-resource set. The eighth field in the fourth downlink information is used for indicating a target second index out of the Q2 second index(es), and the second reference signal resource is a second-type reference signal resource in the Q2 second-type reference signal resource(s) corresponding to the target second index.

In one reference embodiment of the above embodiment, the fifth downlink information comprises part or all of information of a CSI-ResourceConfig IE; and the specific meaning of the CSI-ResourceConfig IE can be found in 3GPP TS38.331.

In one reference embodiment of the above embodiment, the fifth downlink information comprises part or all of information of one or more fields in a CSI-ResourceConfig IE.

In one reference embodiment of the above embodiment, the fifth downlink information comprises part or all of information of an NZP-CSI-RS-ResourceSet IE; and the specific meaning of the NZP-CSI-RS-ResourceSet IE can be found in 3GPP TS38. 331.

In one reference embodiment of the above embodiment, the fifth downlink information comprises part or all of information of an NZP-CSI-RS-Resource IE; and the specific meaning of the NZP-CSI-RS-Resource IE can be found in 3GPP TS38. 331.

In one embodiment, the specific diagram of SRS-Config IE can be found in 3GPP TS38. 331.

Embodiment 21

Figure 21:
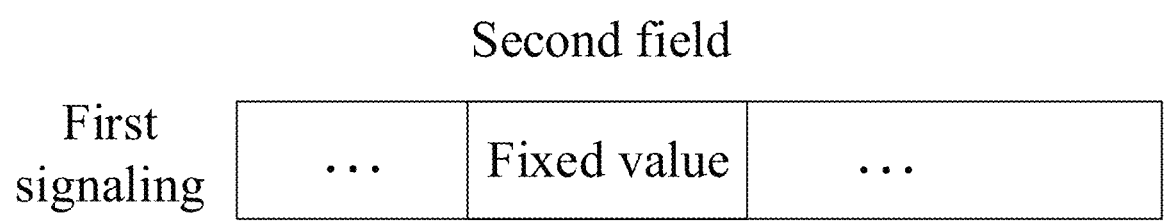
FIG. 21 illustrates a schematic diagram of a second field in a first signaling according to one embodiment of the present disclosure.

Embodiment 21 illustrates a schematic diagram of a second field in a first signaling, as shown in FIG. 21.

In Embodiment 21, the scheduling information of the first radio signal in the present disclosure is non-codebook-based, and a value of the second field in the first signaling is fixed.

In one embodiment, a number of bit(s) comprised in the second field in the first signaling belongs to 1, 2, 3, 4, 5 and 6.

In one embodiment, when the scheduling information of the first radio signal is non-codebook-based, a value of the second field in the first signaling is all-zero.

In one embodiment, when the scheduling information of the first radio signal is non-codebook-based, a value of the second field in the first signaling is all-one.

In one embodiment, when the scheduling information of the first radio signal is non-codebook-based, a value of the second field in the first signaling is pre-configured.

In one embodiment, when the scheduling information of the first radio signal is non-codebook-based, a value of the second field in the first signaling is default (no configuration is required).

Embodiment 22

Figure 22:
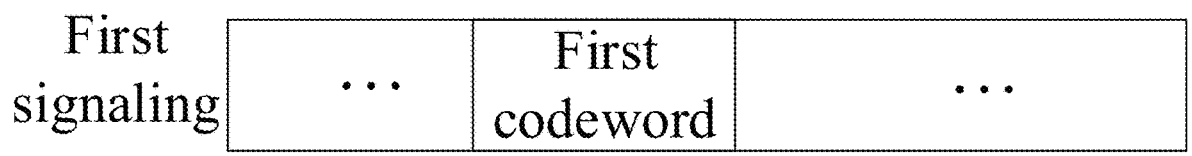
FIG. 22 illustrates a schematic diagram of a second field in a first signaling according to one embodiment of the present disclosure.

Embodiment 22 illustrates a schematic diagram of a second field in a first signaling, as shown in FIG. 22.

In Embodiment 22, the scheduling information of the first radio signal in the present disclosure is codebook-based, and the second field in the first signaling is used for determining a transmitting antenna port group of the first radio signal. The second field in the first signaling indicates a first codeword, and the first codeword is used for determining a transmitting antenna port group of the first radio signal.

In one embodiment, the first codeword is Transmitted Precoding Matrix Indicator (TPMI).

In one embodiment, the codeword is one codeword in a first codebook, the first codebook comprises a positive integer number of codeword(s), and any codeword in the first codebook is a matrix or a vector.

In one embodiment, the second field in the first signaling comprises part or all of information of a precoding information and number of layers field; and the specific meaning of the Precoding information and number of layers field can be found in 3GPP TS38.212, section 7.3.

Embodiment 23

Figure 23:
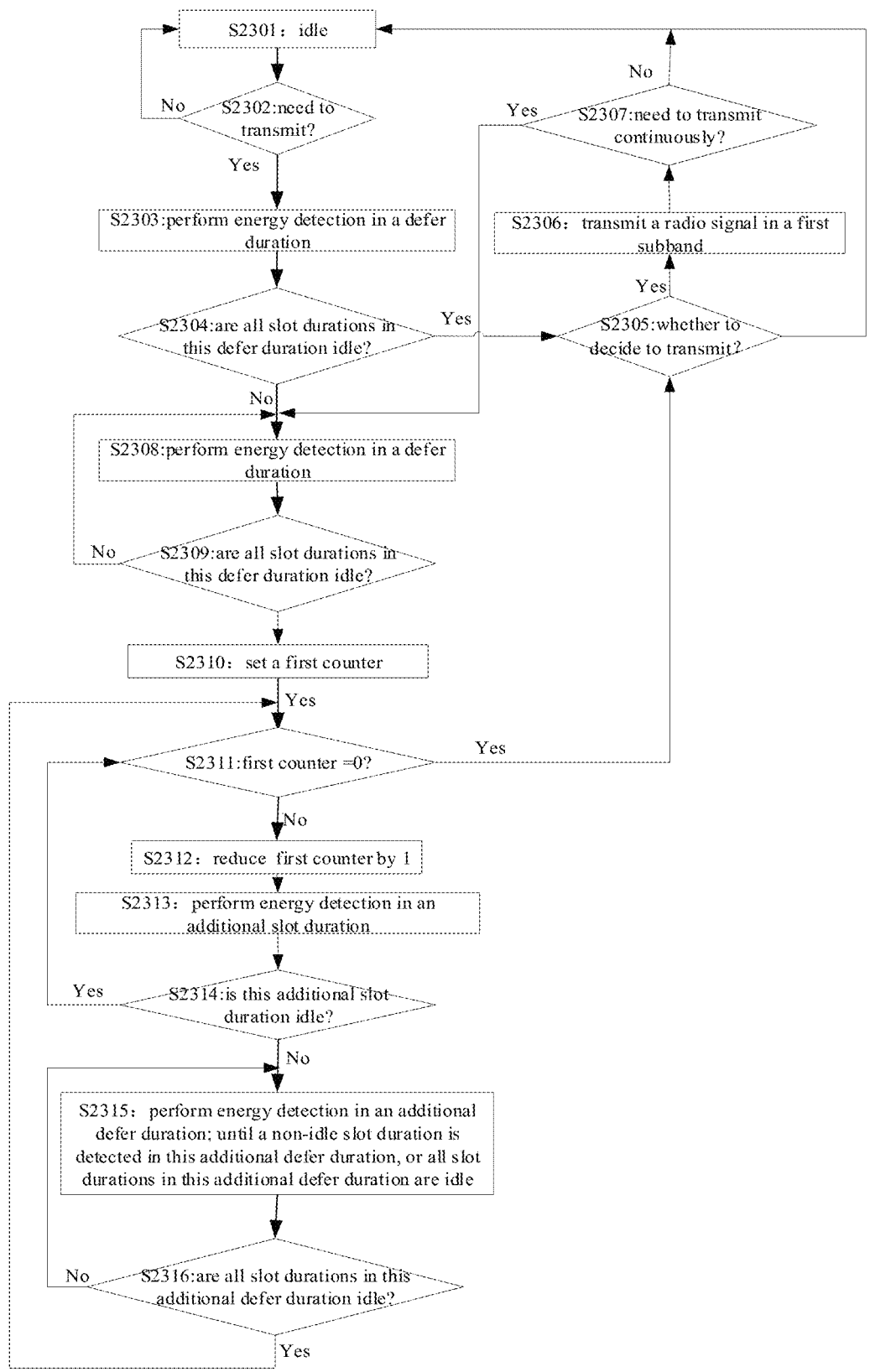
FIG. 23 illustrates a flowchart of given channel access detection according to one embodiment of the present disclosure, the given channel access being one of first channel access detection, second channel access detection or third channel access detection.

Embodiment 23 illustrates a flowchart of given channel access detection, as shown in FIG. 23; the given channel access detection is one of the first channel access detection, the second channel access detection or the third channel access detection in the present disclosure.

In Embodiment 23, a process of the given channel access detection can be illustrated by a flowchart in FIG. 23. A first node is idle in step S2301, judges whether a transmission is needed in step S2302, if yes, goes to step S2303, otherwise returns to step S2301; performs energy detection in a defer duration in the first subband in the present disclosure in step S2303; judges whether all slot durations in the defer duration are idle in step S2304, if yes, goes to step S2305, otherwise goes to step S2308; judges whether a transmission is determined in step S2305, if yes, goes to step S2306, otherwise returns to step S2301; transmits a radio signal in the first subband in step S2306; judges whether a continuous transmission is needed in step S2307, if yes, goes to step S2308, otherwise returns to step S2301; performs energy detection in a defer duration in the first subband in step S2308; judges whether all slot durations in the defer duration are idle in step S2309, if yes, goes to step S2310, otherwise returns to step S2308; sets a first counter in step S2310; judges whether the first counter is 0 in step S2311, if yes, returns to step S2305, otherwise goes to step S2312; reduces the first counter by 1 in step S2312; performs energy detection in an additional slot duration in the first subband in step S2313; judges whether the additional slot duration is idle in step S2314, if yes, returns to step S2311, otherwise goes to step S2315; performs energy detection in an additional defer duration in the first subband in step S2315 until a non-idle slot duration is detected in the additional defer duration, or all slot durations in the additional defer duration are idle; judges whether all slot durations in the additional defer duration are idle in step S2316, if yes, returns to step S2311; otherwise returns to step S2315.

In Embodiment 23, when the given channel access detection is the first channel access detection or the second channel access detection, the first node is the UE in the present disclosure; and when the given channel access detection is the third channel access detection, the first node is the base station in the present disclosure.

In one embodiment, the specific meanings of the defer duration, slot duration, additional slot duration and additional defer duration in FIG. 23 can be found in 3GPP TS36.213, section 15.

In one embodiment, the given channel access detection is used for judging whether the first subband can be used for transmitting a radio signal.

In one embodiment, the given channel access detection is used for judging whether the first subband is idle.

In one embodiment, the given channel access detection is Listen Before Talk (LBT); and the specific meaning and implementation way of the LBT can be found in 3GPP TR36. 889.

In one embodiment, the given channel access detection is Category 4 LBT, and the specific meaning and implementation way of the Category 4 LBT can be found in 3GPP TR36. 889.

In one embodiment, the given channel access detection is Clear Channel Assessment (CCA); and the specific meaning and implementation way of the CCA can be found in 3GPP TR36. 889.

In one embodiment, the given channel access detection is a Channel access procedure for Uplink transmission, and the given channel access detection is the first channel access detection or the second channel access detection; and the specific meaning and implementation way of the Channel access procedure for Uplink transmission can be found in 3GPP TS36.213, section 15.2.

In one embodiment, the given channel access detection is a Type 1 UL channel access procedure, and the given channel access detection is the first channel access detection or the second channel access detection; and the specific meaning and implementation way of the Type 1 UL channel access procedure can be found in 3GPP TS36.213, section 15.2.

In one embodiment, the given channel access detection is a Downlink Channel access procedure, and the given channel access detection is the third channel access detection; and the specific meaning and implementation way of the Downlink Channel access procedure can be found in 3GPP TS36.213, section 15.1.

In one embodiment, the given channel access detection is implemented in the way defined in 3GPP TS36.213, section 15.

In one embodiment, performing energy detection in a given duration means performing energy detection in all slot durations in the given duration; the given duration is any duration among all defer durations in step S2303 and step S2308, all additional slot durations in step S2313 and all additional defer durations in step S2315 in FIG. 23.

In one embodiment, performing energy detection in a slot duration means sensing power of a radio signal in a given time unit and averaging in time to obtain a received power; the given time unit is a duration in the one slot duration.

In one embodiment, performing energy detection in a slot duration means sensing energy of a radio signal in a given time unit and averaging in time to obtain a received energy; the given time unit is a duration in the one slot duration.

In one embodiment, a slot duration being idle means that sensing power of a radio signal in a given time unit and averaging in time, from which a received power obtained is lower than a reference threshold; the given time unit is a duration in the one slot duration.

In one embodiment, a slot duration being idle means that sensing energy of a radio signal in a given time unit and averaging in time, from which a received energy obtained is lower than a reference threshold; the given time unit is a duration in the one slot duration.

In one embodiment, a duration of the given time unit lasts no shorter than 4 μs.

In one embodiment, a defer duration lasts as long as 16 μs plus a positive integral multiple of 9 μs.

In one embodiment, a defer duration comprises multiple slot durations.

In one subembodiment of the above embodiment, a first slot duration and a second slot duration in the multiple slot durations are non-consecutive.

In one subembodiment of the above embodiment, a first slot duration and a second slot duration in the multiple slot durations are spaced by 7 ms.

In one embodiment, a defer duration lasts as long as an additional defer duration.

In one embodiment, a slot duration lasts 9 μs.

In one embodiment, an additional slot duration lasts as long as a slot duration.

In one embodiment, the first counter is set to be equal to one candidate integer of P+1 candidate integers in step S2308.

In one embodiment, the P belongs to 3, 7, 15, 31, 63, 127, 255, 511 and 1023.

In one embodiment, the P is a CWp in the Category 4 LBT process, the CWp being size of a contention window, and the specific meaning of the CWp can be found in 3GPP TS36. 213, section 15.

In one embodiment, the P+1 candidate integers are 0, 1, 2, . . . , P.

In one embodiment, the first node randomly selects a candidate integer out of the P+1 candidate integers as a set value of the first counter.

In one embodiment, a probability that any of the P+1 candidate integers is selected as a set value of the first counter is equal.

Embodiment 24

Figure 24:
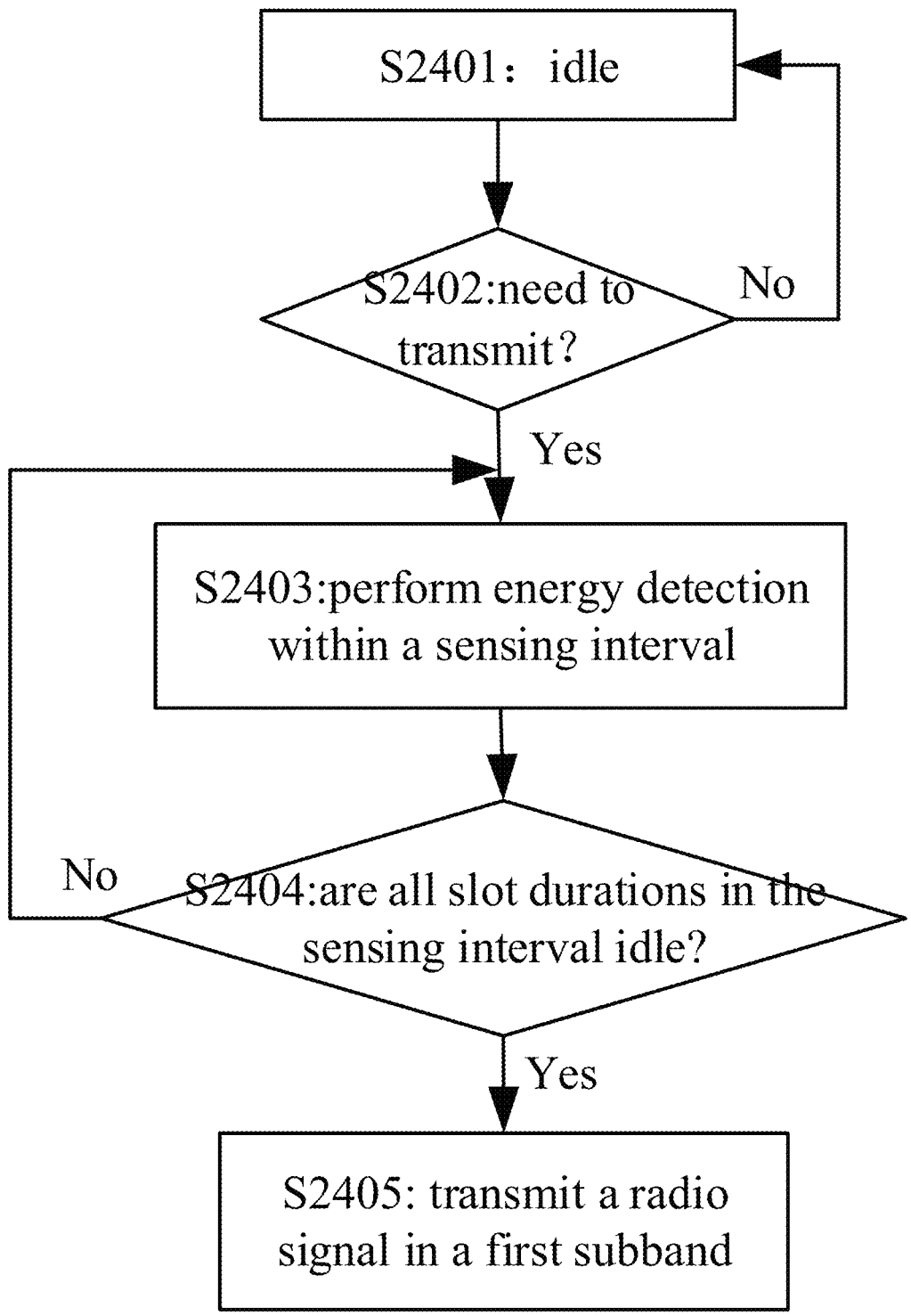
FIG. 24 illustrates a flowchart of given channel access detection according to one embodiment of the present disclosure, the given channel access being one of first channel access detection, second channel access detection or third channel access detection.

Embodiment 24 illustrates a flowchart of given channel access detection, as shown in FIG. 24; the given channel access detection is one of the first channel access detection, the second channel access detection or the third channel access detection in the present disclosure.

In Embodiment 24, a process of the given channel access detection can be illustrated by a flowchart in FIG. 24. The first node is idle in step S2401, and judges whether a transmission is needed in step S2402, if yes, goes to step 2403, otherwise returns to step S2401; performs energy detection in a sensing interval in the first subband in the present disclosure in step S2403; judges whether all slot durations in the sensing interval are idle in step S2404, if yes, goes to step S2405, otherwise returns to step S2403; and transmits a radio signal in the first subband in step S2405.

In Embodiment 24, when the given channel access detection is the first channel access detection or the second channel access detection, the first node is the UE in the present disclosure; when the given channel access detection is the third channel access detection, the first node is the base station in the present disclosure.

In one embodiment, the specific meaning of the sensing interval and slot duration in FIG. 24 can be found in 3GPP TS36.213, section 15.

In one embodiment, the given channel access detection is Category 2 LBT, and the specific meaning and implementation way of the Category 2 LBT can be found in 3GPP TR36. 889.

In one embodiment, the given channel access detection is a Type 2 UL channel access procedure, and the given channel access detection is the first channel access detection or the second channel access detection; and the specific meaning and implementation way of the Type 2 UL channel access procedure can be found in 3GPP TS36.213, chapter 15.2.

In one embodiment, performing energy detection in a sensing interval means: performing energy detection in all slot durations in the one sensing interval.

In one embodiment, a sensing interval lasts 25 μs.

In one embodiment, a sensing interval comprises two slot durations, the two slot durations being non-consecutive in time domain.

In one subembodiment of the above embodiment, a time interval between the two slot durations is 7 μs.

Embodiment 25

Figure 25:
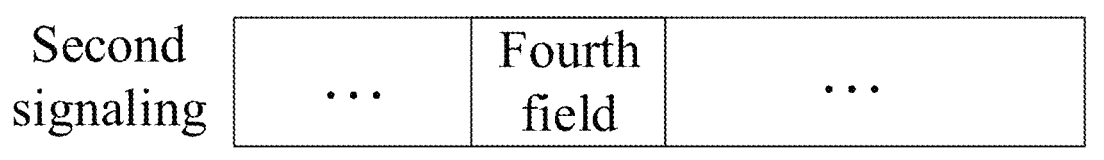

Embodiment 25 illustrates a schematic diagram of a second signaling, as shown in FIG. 25.

In Embodiment 25, the second signaling is used for triggering transmission of the first-type reference signal in the present disclosure. The first-type reference signal is transmitted in the first reference-signal-resource set in the present disclosure. The second signaling comprises a fourth field, and the fourth field in the second signaling indicates the first reference-signal-resource set.

In one embodiment, the second signaling is a physical-layer signaling.

In one embodiment, the second signaling is a dynamic signaling.

In one embodiment, the second signaling is a dynamic signaling used for UpLink Grant.

In one embodiment, the second signaling is a dynamic signaling used for Downlink Grant.

In one embodiment, the second signaling comprises DCI.

In one embodiment, the second signaling comprises UpLink Grant DCI.

In one embodiment, the second signaling comprises DownLink Grant DCI.

In one embodiment, the second signaling is UE-specific.

In one embodiment, the second signaling is terminal-group-specific, the terminal group comprises a positive integer number of terminal(s), and the UE in the present disclosure is one terminal in the terminal group.

In one embodiment, a signaling identifier for the second signaling is a C-RNTI.

In one embodiment, the second signaling is DCI identified by a C-RNTI.

In one embodiment, a signaling identifier of the second signaling is TPC (Transmitter Power Control)-SRS-RNTI.

In one embodiment, the second signaling is DCI identified by a TPC-SRS-RNTI.

In one embodiment, the second signaling comprises a fourth field, and the fourth field in the second signaling indicates the first reference-signal-resource set.

In one embodiment, the fourth field in the second signaling comprises part or all of information in an SRS request field; and the specific meaning of the SRS request field can be found in 3GPP TS38.212, section 7.3.

In one embodiment, the fourth field in the second signaling consists of two bits.

In one embodiment, the first reference-signal-resource set is one of M3 reference-signal-resource set(s), and any set of the M3 reference-signal-resource set comprises a positive integer number of first-type reference signal resource(s). The fourth field in the second signaling indicates the first reference-signal-resource set out of the M3 reference-signal-resource set(s), the M3 being a positive integer.

In one embodiment, the fourth field in the second signaling indicates the second reference signal resource in the present disclosure.

In one embodiment, the fourth field in the second signaling explicitly indicates the second reference signal resource in the present disclosure.

In one embodiment, the fourth field in the second signaling implicitly indicates the second reference signal resource in the present disclosure.

Embodiment 26

Figure 26:
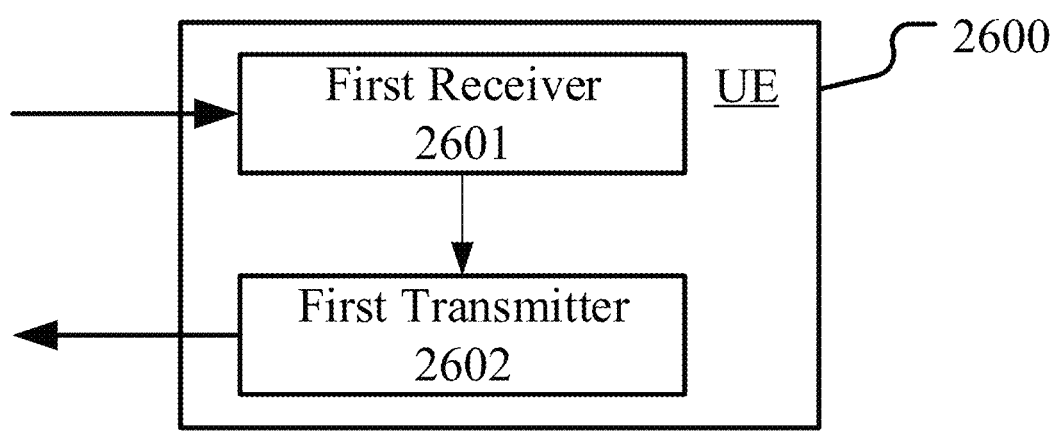
FIG. 26 illustrates a structure block diagram of a processing device of a UE according to one embodiment of the present disclosure.

Embodiment 26 illustrates a structure block diagram of a processing device in a UE, as shown in FIG. 26. In FIG. 26, a UE's processing device 2600 in UE consists of a first receiver 2601 and a first transmitter 2602.

In Embodiment 26, a first receiver 2601 receives a first signaling; and a first transmitter 2602 transmits a first radio signal in a first subband.

In Embodiment 26, the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the first transmitter 2602 also transmits a first-type reference signal in a first reference-signal-resource set in the first subband; herein, a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1.

In one embodiment, the first signaling comprises a second field, when the scheduling information of the first radio signal is non-codebook-based, a value of the second field in the first signaling is fixed; when the scheduling information of the first radio signal is codebook-based, the second field in the first signaling is used for determining a transmitting antenna port group of the first radio signal, the transmitting antenna port group of the first radio signal comprising a positive integer number of antenna port(s).

In one embodiment, the first field in the first signaling is used for determining the first subband, and whether the scheduling information of the first radio signal is noncodebook-based or codebook-based is related to whether frequency resources occupied by the first signaling belong to the first subband.

In one embodiment, the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

In one embodiment, the first signaling comprises a third field, the first field in the first signaling is used for determining the first subband, the third field in the first signaling is used for determining the first reference-signal-resource group, and whether the scheduling information of the first radio signal is non-codebook-based or codebook-based is related to both the first field in the first signaling and the third field in the first signaling.

In one embodiment, the first receiver 2601 also receives downlink information; herein, the downlink information is used for determining the M subbands.

In one embodiment, the first receiver 2601 also receives a second-type reference signal in a second reference signal resource in the first subband; herein, the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s).

In one embodiment, the first receiver 2601 also performs a first channel access detection in the first subband; herein, the first channel access detection is used for determining that the first subband can be used by the first transmitter 2602 for transmitting the first radio signal.

In one embodiment, the first receiver 2601 also performs a second channel access detection in the first subband; herein, the second channel access detection is used for determining that the first subband can be used by the first transmitter 2602 for transmitting the first-type reference signal.

In one embodiment, the first receiver 2601 also receives second signaling; herein, the second signaling is used for triggering transmission of the first-type reference signal.

In one embodiment, the first receiver 2601 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 2602 comprises at least one of the antenna 452, the transmitter 454, the transmitting processor 468, the multi-antenna transmitting processor 457, the controller/processor 459, the memory 460, or the data source 467 in Embodiment 4.

Embodiment 27

Figure 27:
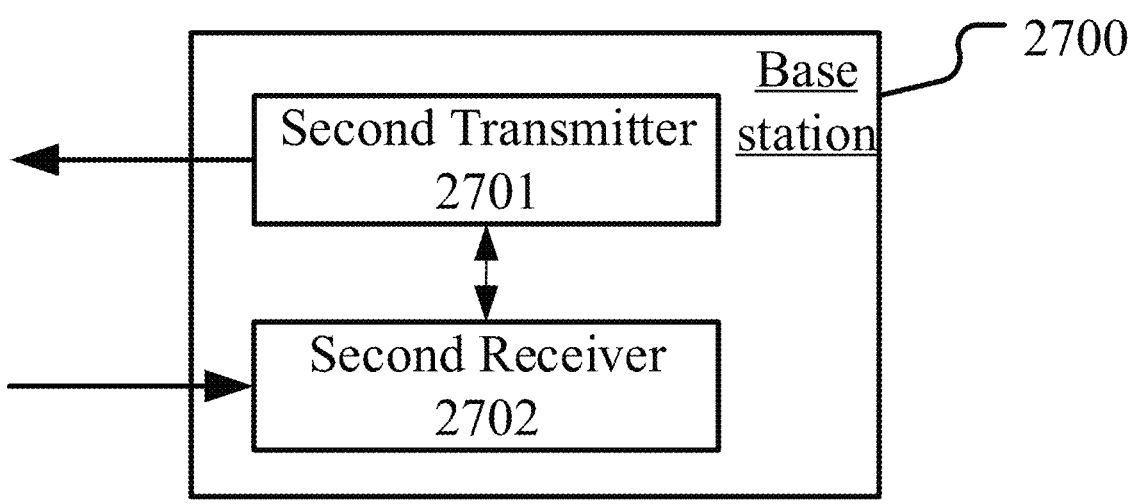
FIG. 27 illustrates a structure block diagram of a processing device of a base station according to one embodiment of the present disclosure.

Embodiment 27 illustrates a structure block diagram of a processing device for a base station, as shown in FIG. 27. In FIG. 27, a base station's processing device 2700 consists of a second transmitter 2701 and a second receiver 2702.

In Embodiment 27, a second transmitter 2701 transmits a first signaling; and a second receiver 2702 receives a first radio signal in a first subband.

In Embodiment 27, the first signaling comprises scheduling information of the first radio signal; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

In one embodiment, the second receiver 2702 also receives a first-type reference signal in the first reference-signal-resource set in the first subband; herein, a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1.

In one embodiment, the first signaling comprises a second field, when the scheduling information of the first radio signal is non-codebook-based, a value of the second field in the first signaling is fixed; when the scheduling information of the first radio signal is codebook-based, the second field in the first signaling is used for determining a transmitting antenna port group of the first radio signal, the transmitting antenna port group of the first radio signal comprising a positive integer number of antenna port(s).

In one embodiment, the first field in the first signaling is used for determining the first subband, and whether the scheduling information of the first radio signal is non-codebook-based or codebook-based is related to whether frequency resources occupied by the first signaling belong to the first subband.

In one embodiment, the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

In one embodiment, the first signaling comprises a third field, the first field in the first signaling is used for determining the first subband, the third field in the first signaling is used for determining the first reference-signal-resource group, and whether the scheduling information of the first radio signal is non-codebook-based or codebook-based is related to both the first field in the first signaling and the third field in the first signaling.

In one embodiment, the second transmitter 2701 also transmits downlink information; herein, the downlink information is used for determining the M subbands.

In one embodiment, the second transmitter 2701 also transmits a second-type reference signal in a second reference signal resource in the first subband; herein, the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s).

In one embodiment, the second receiver 2702 also performs third channel access detection in the first subband; herein, the third channel access detection is used for determining that the first subband can be used by the second transmitter 2701 for transmitting the second-type reference signal.

In one embodiment, the second transmitter 2701 also transmits a second signaling; herein, the second signaling is used for triggering transmission of the first-type reference signal.

In one embodiment, the second transmitter 2701 comprises at least one of the antenna 420, the transmitter 418, the transmitting processor 416, the multi-antenna transmitting processor 471, the controller/processor 475, or the memory 476 in Embodiment 4.

In one embodiment, the second receiver 2602 comprises at least one of the antenna 420, the receiver 418, the receiving processor 470, the multi-antenna receiving processor 472, the controller/processor 475, or the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
receiving a first signaling; and
transmitting a first radio signal in a first subband;
wherein the first signaling comprises scheduling information of the first radio signal, and the scheduling information of the first radio signal comprises at least one of occupied time-domain resources, occupied frequency-domain resources, a Modulation and Coding Scheme (MCS), a Hybrid Automatic Repeat reQuest (HARQ) process number, a Redundancy Version (RV) or a New Data Indicator (NDI); the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

2. The method according to claim 1, comprising:
transmitting a first-type reference signal in a first reference-signal-resource set in the first subband,
wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1;
or, comprising:
receiving a second-type reference signal in a second reference-signal resource in the first subband, and
transmitting a first-type reference signal in a first reference-signal-resource set in the first subband,
wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1; the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s);
or, comprising:
performing at least one of first channel access detection or second channel access detection in the first subband, and
transmitting a first-type reference signal in a first reference-signal-resource set in the first subband,
wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1; the first channel access detection and the second channel access detection are respectively used for determining that the first subband can be used for transmitting the first radio signal and the first-type reference signal;
or, comprising:
receiving a second signaling, and
transmitting a first-type reference signal in a first reference-signal-resource set in the first subband,
wherein a measurement performed on the first-type reference signal is used for determining the scheduling information of the first radio signal, the first reference-signal-resource set comprises K first-type reference-signal resource(s), and the first reference-signal-resource group is a subset of the first reference-signalresource set, the K being a positive integer no less than the K1; the second signaling is used for triggering transmission of the first-type reference signal.

3. The method according to claim 1, wherein the first signaling comprises a second field, when the scheduling information of the first radio signal is non-codebook-based, a value of the second field in the first signaling is fixed; and when the scheduling information of the first radio signal is codebook-based, the second field in the first signaling is used for determining a transmitting antenna port group of the first radio signal, the transmitting antenna port group of the first radio signal comprising a positive integer number of antenna port(s).

4. The method according to claim 1, wherein the first field in the first signaling is used for determining the first subband, whether the scheduling information of the first radio signal is non-codebook-based or codebook-based is related to whether frequency resources occupied by the first signaling belong to the first subband.

5. The method according to claim 1, wherein the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

6. The method according to claim 1, wherein the first signaling comprises a third field, the first field in the first signaling is used for determining the first subband, the third field in the first signaling is used for determining the first reference-signal-resource group, and whether the scheduling information of the first radio signal is non-codebook-based or codebook-based is related to both the first field in the first signaling and the third field in the first signaling.

7. The method according to claim 1, comprising:
receiving downlink information;
wherein the downlink information is used for determining the M subbands.

8. A UE for wireless communications, comprising:
a first receiver, receiving a first signaling; and
a first transmitter, transmitting a first radio signal in a first subband;
wherein the first signaling comprises scheduling information of the first radio signal, the scheduling information of the first radio signal comprising at least one of occupied time-domain resources, occupied frequency-domain resources, a MCS, a HARQ process number, an RV or a NDI; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

9. The UE according to claim 8, wherein the first transmitter transmits a first-type reference signal in a first reference-signal-resource set in the first subband; wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1;

or, the first receiver receives a second-type reference signal in a second reference signal resource in the first subband, and the first transmitter transmits a first-type reference signal in a first reference-signal-resource set in the first subband; wherein a measurement performed on the first-type reference signal is used for determining the scheduling information of the first radio signal, the first reference-signal-resource set comprises K first-type reference-signal resource(s), the first reference-signal-resource group is a subset of the first reference-signal-resource set, the K being a positive integer no less than the K1; the first reference-signal-resource set is non-codebook-based, and a measurement performed on the second-type reference signal is used for determining a transmitting antenna port group of the first-type reference signal, the transmitting antenna port group of the first-type reference signal comprises a positive integer number of antenna port(s);

or, the first receiver performs at least one of first channel access detection and second channel access detection in the first subband, and the first transmitter transmits a first-type reference signal in a first reference-signal-resource set in the first subband; wherein a measurement performed on the first-type reference signal is used for determining the scheduling information of the first radio signal, the first reference-signal-resource set comprises K first-type reference-signal resource(s), the first reference-signal-resource group is a subset of the first reference-signal-resource set, the K being a positive integer no less than the K1, and the first channel access detection and the second channel access detection are respectively used for determining that the first subband can be used for transmitting the first radio signal and the first-type reference signal;

or, the first receiver receives a second signaling, the first transmitter transmits a first-type reference signal in a first reference-signal-resource set in the first subband; wherein a measurement performed on the first-type reference signal is used for determining the scheduling information of the first radio signal, the first reference-signal-resource set comprises K first-type reference-signal resource(s), the first reference-signal-resource group is a subset of the first reference-signal-resource set, the K being a positive integer no less than the K1, and the second signaling is used for triggering a transmission of the first-type reference signal.

10. The UE according to claim 8, wherein the first signaling comprises a second field, when the scheduling information of the first radio signal is non-codebook-based, a value of the second field in the first signaling is fixed; and when the scheduling information of the first radio signal is codebook-based, the second field in the first signaling is used for determining a transmitting antenna port group of the first radio signal, the transmitting antenna port group of the first radio signal comprising a positive integer number of antenna port(s).

11. The UE according to claim 8, wherein the first field in the first signaling is used for determining the first subband, whether the scheduling information of the first radio signal is non-codebook-based or codebook-based is related to whether frequency resources occupied by the first signaling belong to the first subband.

12. The UE according to claim 8, wherein the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is non-codebook-based or codebook-based is related to whether the first reference-signal-resource set is non-codebook-based or codebook-based.

13. The UE according to claim 8, wherein the first signaling comprises a third field, the first field in the first signaling is used for determining the first subband, and the third field in the first signaling is used for determining the first reference-signal-resource group; whether the scheduling information of the first radio signal is non-codebook-based or codebook-based is related to both the first field in the first signaling and the third field in the first signaling.

14. The UE according to claim 8, wherein the first receiver receives downlink information; wherein the downlink information is used for determining the M subbands.

15. A base station for wireless communication, comprising:
   a second transmitter, transmitting a first signaling; and
   a second receiver, receiving a first radio signal in a first subband;
   wherein the first signaling comprises scheduling information of the first radio signal, and the scheduling information of the first radio signal comprises at least one of occupied time-domain resources, occupied frequency-domain resources, a MCS, a HARQ process number, an RV or a NDI; the first signaling comprises a first field, the first field in the first signaling being used for determining a first reference-signal-resource group or the first subband, the first reference-signal-resource group comprising K1 first-type reference signal resource(s), the K1 being a positive integer; whether the scheduling information of the first radio signal is non-codebook-based or codebook-based is related to the first field in the first signaling; and the first subband is one of M subbands, the M being a positive integer greater than 1.

16. The base station according to claim 15, wherein the second receiver receives a first-type reference signal in a first reference-signal-resource set in the first subband; wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1;
   or, the second transmitter transmits a second-type reference signal in a second reference signal resource in the first subband, and the second receiver receives a first-type reference signal in a first reference-signal-resource set in the first subband; wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1; the first reference-signal-resource set is non-codebook-based, and a measurement performed on the second-type reference signal is used for determining a transmitting antenna port group of the first-type reference signal, the transmitting antenna port group of the first-type reference signal comprising a positive integer number of antenna port(s);
   or, the second transmitter transmits a second-type reference signal in a second reference signal resource in the first subband, and the second receiver performs third channel access detection in the first subband and receives a first-type reference signal in a first reference-signal-resource set in the first subband; wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1; the first reference-signal-resource set is non-codebook-based, a measurement performed on the second-type reference signal is used for determining a transmitting antenna port group of the first-type reference signal, the transmitting antenna port group of the first-type reference signal comprising a positive integer number of antenna port(s); the third channel access detection is used for determining that the first subband can be used for transmitting the second-type reference signal;
   or, the second transmitter transmits a second signaling, and the second receiver receives a first-type reference signal in a first reference signal resource set in the first subband; wherein a measurement performed on the first-type reference signal is used for determining the scheduling information of the first radio signal, the first reference-signal-resource set comprises K first-type reference-signal resource(s), and the first reference-signal-resource group is a subset of the first reference-signal-resource set, the K being a positive integer no less than the K1; and the second signaling is used for triggering transmission of the first-type reference signal.

17. The base station according to claim 15, wherein the first signaling comprises a second field, when the scheduling information of the first radio signal is non-codebook-based, a value of the second field in the first signaling is fixed; and when the scheduling information of the first radio signal is codebook-based, the second field in the first signaling is used for determining a transmitting antenna port group of the first radio signal, the transmitting antenna port group of the first radio signal comprising a positive integer number of antenna port(s);
   or, the second transmitter transmits downlink information; wherein the downlink information is used for determining the M subbands.

18. The base station according to claim 15 wherein the first field in the first signaling is used for determining the first subband, and whether the scheduling information of the first radio signal is non-codebook-based or codebook-based is related to whether frequency resources occupied by the first signaling belong to the first subband.

19. The base station according to claim 15, wherein the first field in the first signaling is used for determining the first reference-signal-resource group, the first reference-signal-resource group being a subset of a first reference-signal-resource set, and the first reference-signal-resource set comprises K first-type reference signal resource(s), the K being a positive integer no less than the K1; whether the scheduling information of the first radio signal is noncodebook-based or codebook-based is related to whether the first reference-signal-resource set is non-codebook-based or codebook-based.

20. The base station according to claim 15, wherein the first signaling comprises a third field, the first field in the first signaling is used for determining the first subband, the third field in the first signaling is used for determining the first reference-signal-resource group; and whether the scheduling information of the first radio signal is non-codebook-based or codebook-based is related to both the first field in the first signaling and the third field in the first signaling.

\* \* \* \* \*